(12) United States Patent
Kanemoto et al.

(10) Patent No.: US 9,209,430 B2
(45) Date of Patent: Dec. 8, 2015

(54) CYLINDRICAL BATTERY

(71) Applicant: GS Yuasa International Ltd., Kyoto-shi, Kyoto (JP)

(72) Inventors: Manabu Kanemoto, Kyoto (JP); Mitsuhiro Kodama, Kyoto (JP); Tadashi Kakeya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 179 days.

(21) Appl. No.: 14/107,041

(22) Filed: Dec. 16, 2013

(65) Prior Publication Data

US 2014/0170463 A1    Jun. 19, 2014

(30) Foreign Application Priority Data

Dec. 19, 2012  (JP) ................... 2012-276676
Dec. 19, 2012  (JP) ................... 2012-276677

(51) Int. Cl.
*H01M 2/18*  (2006.01)
*H01M 2/02*  (2006.01)
*H01M 10/04* (2006.01)
(Continued)

(52) U.S. Cl.
CPC .......... *H01M 2/022* (2013.01); *H01M 10/045* (2013.01); *H01M 10/0422* (2013.01); *H01M 10/0468* (2013.01); *H01M 10/286* (2013.01); *H01M 10/30* (2013.01); *H01M 10/345* (2013.01); *H01M 10/0525* (2013.01); *H01M 10/0583* (2013.01); *Y02E 60/124* (2013.01)

(58) Field of Classification Search
CPC .......... H01M 10/0422; H01M 10/045; H01M 10/0468; H01M 10/0525; H01M 10/0583; H01M 10/286; H01M 10/30; H01M 10/345; H01M 2/022; Y02E 60/124
USPC .................. 429/100, 129, 130, 132, 138, 164
See application file for complete search history.

(56) References Cited

U.S. PATENT DOCUMENTS 4,186,246 A   1/1980  Sugalski
4,262,414 A   4/1981  Sugalski
(Continued)

FOREIGN PATENT DOCUMENTS

EP   2317587    5/2011
JP   61-202876  12/1986
(Continued)

OTHER PUBLICATIONS

Extended European Search Report dated Apr. 4, 2014 filed in the corresponding European patent application No. 13197927.0.

*Primary Examiner* — Patrick Ryan
*Assistant Examiner* — Ben Lewis
(74) *Attorney, Agent, or Firm* — Rankin, Hill & Clark LLP

(57) ABSTRACT

A cylindrical battery including: a battery case having a cylindrical shape; an electrode group disposed in the battery case, including a positive electrode, a negative electrode, and a separator, and having a pair of flat outer side surfaces opposed to each other; and a spacer disposed between an inner peripheral surface of the battery case and each of the flat outer side surfaces of the electrode group. The spacer has a case contact portion that extends continuously from a first axial end to a second axial end and is in contact with the inner peripheral surface of the battery case, and the case contact portion is formed with a communicating portion that communicates spaces partitioned by the case contact portion.

12 Claims, 19 Drawing Sheets

(51) Int. Cl.
*H01M 10/30* (2006.01)
*H01M 10/34* (2006.01)
*H01M 10/28* (2006.01)
*H01M 10/0583* (2010.01)
*H01M 10/0525* (2010.01)

(56) References Cited

U.S. PATENT DOCUMENTS 6,117,583 A 9/2000 Nilsson et al.
8,546,007 B2 10/2013 Lee et al.
2011/0104540 A1* 5/2011 Lee et al. .................. 429/94

FOREIGN PATENT DOCUMENTS

| | | |
|---|---|---|
| JP | 11-185767 | 7/1999 |
| JP | 2001-068166 | 3/2001 |
| WO | 2013/012084 | 1/2013 |

* cited by examiner

LAYERED DIRECTION L

POSITION OF
UPSTANDING CURRENT
COLLECTING TERMINAL 311

☐ INDICATES EXPOSED PORTIONS IN AN OUTER SIDE SURFACE OF A NEGATIVE ELECTRODE PLATE.

☐ INDICATES EXPOSED PORTIONS IN AN OUTER SIDE SURFACE OF A NEGATIVE ELECTRODE PLATE.

CYLINDRICAL BATTERY

CROSS-REFERENCE TO RELATED APPLICATIONS

This application claims the benefit of Japanese patent applications No. 2012-276670 and No 2012-276677, filed on Dec. 19, 2012, which are incorporated by reference.

FIELD

The present invention relates to a cylindrical battery

BACKGROUND

As disclosed in JP-A-11-185767, there is a conventional cylindrical battery that includes a battery case having a cylindrical shape, and an electrode group having a columnar shape and accommodated in the battery case. In the electrode group, belt-shaped positive and negative electrode plates are spirally wound with as belt-shaped separator being interposed therebetween.

In the configuration in which the positive electrode plate, the negative electrode plate, and the separator in the belt shapes are spirally wound, the positive electrode plate and the negative electrode plate may be displaced in the winding step. In this case, there arise problems that the cylindrical battery fails to achieve desired battery capacity, internal short-circuit occurs, and the like.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In order to solve the various problems due to winding displacement and related to the winding displacement, the inventor of this application has devised a configuration in which a cylindrical battery includes a layered (stacked) electrode group.

In the case where the cylindrical battery includes the layered electrode group, a cylindrical battery case accommodates an electrode group having a substantially rectangular parallelepiped shape or the like. The electrode group may move in the battery case and active materials of the plates may be thus separated. This leads to deterioration in charge-discharge performance.

In order to inhibit such movement of the electrode group, the inventor of this application has devised a configuration in which the electrode group is fixed in the battery case using spacers. As shown in FIG. 19, the spacers devised by the inventor of this application each include an electrode contact portion that has a first surface serving as a contact surface with an outer side surface of the electrode group, and a case contact portion that extends from a second surface of the electrode contact portion and is in contact with the inner peripheral surface of the battery case from the top to the bottom.

In the above configuration, the case contact portion partitions a space formed between the inner peripheral surface of the battery case and the outer side surface of the electrode group. When an electrolyte solution is filled in one of the spaces partitioned by the case contact portion, the electrolyte solution does not or is unlikely to flow into the other space. If a predetermined amount of the electrolyte solution to be filled in the battery case is filled at one time, the electrolyte solution overflows from the battery case. In order to prevent such overflow of the electrolyte solution, the electrolyte solution needs to be filled gradually for several times, which deteriorates workability.

The present invention has been made to solve the problems mentioned above, and an object thereof is to provide a cylindrical battery that has strength against increase, in internal pressure of the battery and does not require consideration of winding displacement in an electrode group. In the cylindrical battery, the electrode group is fixed in the battery case using spacers and circulation of an electrolyte solution being filled is improved.

A first aspect of the present invention provides a cylindrical battery including a battery case having a cylindrical shape; an electrode group disposed in the battery case, including a positive electrode, a negative electrode, and a separator, and having a pair of flat outer side surfaces opposed to each other; and a spacer disposed between an inner peripheral surface of the battery case and each of the flat outer side surfaces of the electrode group, wherein the spacer has at least one case contact portion that extends continuously from a first axial end to a second axial end and is in contact with the inner peripheral surface of the battery case, and the case contact portion is formed with at least one communicating portion that communicates spaces partitioned by the case contact portion.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION

Figure 1:
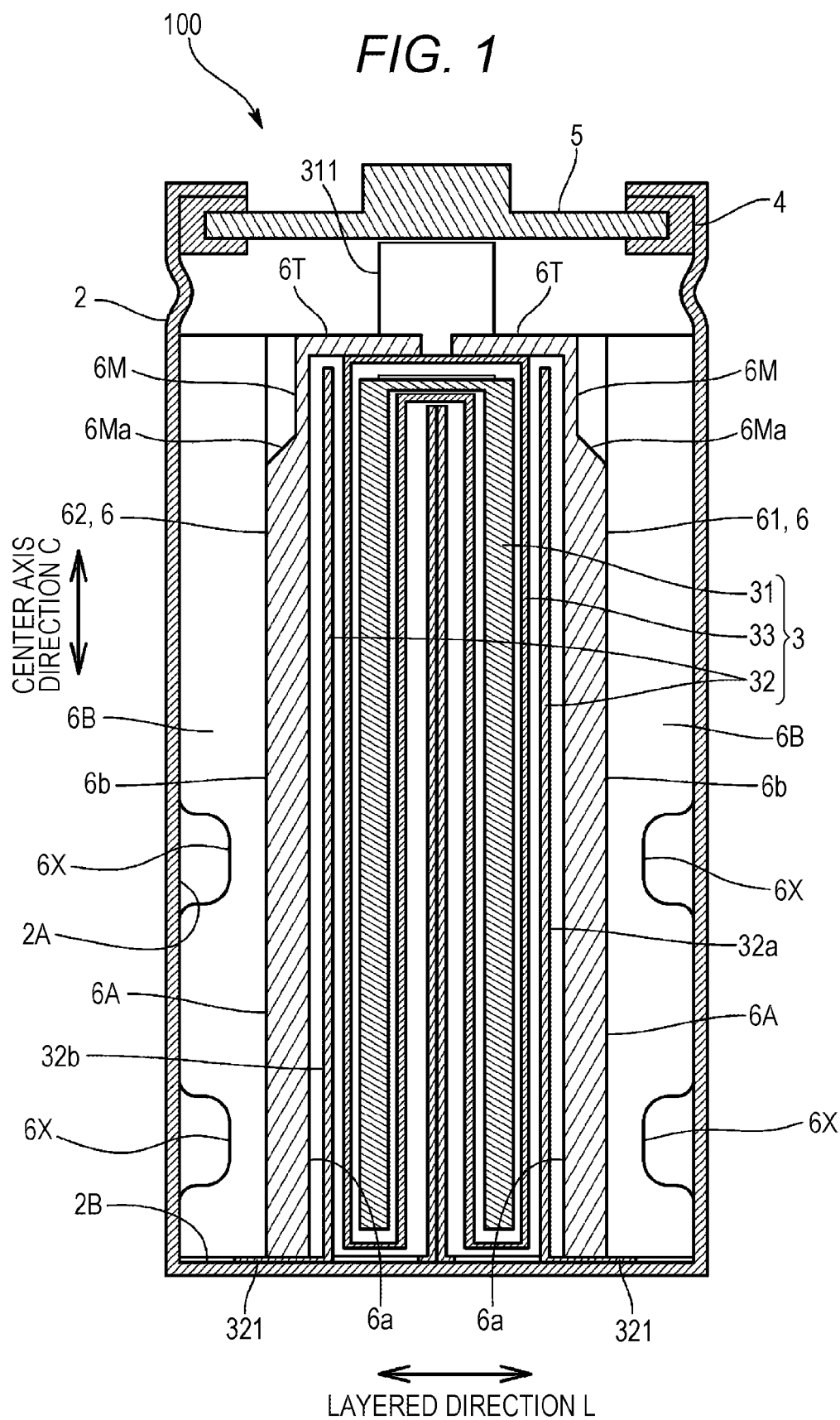
FIG. 1 shows a longitudinal sectional view of a cylindrical battery according to a first embodiment.

Aspects of the present invention will be described hereinafter.

A first aspect of the present invention provides a cylindrical battery including: a battery case having a cylindrical shape; an electrode group disposed in the battery case, including a positive electrode, a negative electrode, and a separator, and having a pair of flat outer side surfaces opposed to each other; and a spacer disposed between an inner peripheral surface of the battery case and each of the flat outer side surfaces of the electrode group, wherein the spacer has at least one case contact portion that extends continuously from a first axial end to a second axial end and is in contact with the inner peripheral surface of the battery case, and the case contact portion is provided with at least one communicating portion that communicates spaces partitioned by the case contact portion.

In this configuration, the battery case accommodates the electrode group including the positive electrode, the negative electrode, and the separator and having the paired flat outer side surfaces opposed to each other. It is thus possible to provide the battery that does not cause various problems due to winding displacement in the electrode group and related to the winding displacement. The battery case having the cylindrical shape enhances strength against increase in internal pressure. The spacers for fixing the electrode group prevent movement of the electrode group relative to the battery case. This configuration suppresses separation of active materials in the plates and prevents deterioration in charge-discharge performance. Furthermore, the case contact portion in contact with the inner peripheral surface of the battery case is formed with the communicating portion that connects the spaces partitioned by the case contact portion. When an electrolyte solution is filled in one of the spaces partitioned by the case contact portion, the filled electrolyte solution flows into the other space through the communicating portion. This configuration improves circulation of the electrolyte solution. In addition, the case contact portion is provided at the spacer so as to extend continuously from the first axial end to the second axial end. The spacer is thus increased in mechanical strength, and work is facilitated when assembling the cylindrical battery, for example.

According to a second aspect of the present invention, the at least one communicating portion preferably includes a plurality of communicating portions formed in the case contact portion with an interval in an axial direction. The communicating portions provided at the plurality of positions further improve circulation of the electrolyte solution being filled.

According to a third aspect of the present invention, the communicating portion is preferably a concave part formed on a free end side of the case contact portion, and the free end side is in contact with the inner peripheral surface of the batters case. When the communicating portion is provided as the concave part, the inner peripheral surface of the battery case and the concave part form communicating spaces. The electrolyte solution thus flows along the inner peripheral surface of the battery case, and circulation of the electrolyte solution can be further improved.

According to a fourth aspect of the present invention, the communicating portion is preferably a through hole formed in the case contact portion. When the communicating portion is provided as the through hole, the free end side of the case contact portion is substantially in entire contact with the inner peripheral surface of the battery case. The spacer thus fixes the electrode group more reliably. Furthermore, when the free end side of the case contact portion is not provided with any concave part, the spacer can be easily inserted into the battery case when assembling the cylindrical battery.

According to a fifth aspect of the present invention, preferably, the spacer has an electrode contact portion having a first surface serving as a contact surface with one of the outer side surfaces of the electrode group, and the case contact portion is provided on a second surface of the electrode contact portion and extend continuously from a first axial end to a second axial end of the electrode contact portion. In this configuration, the second surface of the electrode contact portion, the side surface of the case contact portion, and the inner peripheral surface of the battery case form a space communicated from the top to the bottom, which is secured as a space accommodating the electrolyte solution. When the communicating portion is provided at the case contact portion in the battery containing the electrolyte solution filled in the space communicated from the top to the bottom, it is possible to more significantly improve circulation of the electrolyte solution.

According to a sixth aspect of the present invention, the at least one case contact portion preferably includes at least two case contact portions that are disposed on the second surface of the electrode contact portion and are parallel to each other in a center axis direction. In this configuration, each of the case contact portions is preferably provided with the communicating portion. Furthermore, the two case contact portions are preferably provided symmetrically with respect to the center axis. In this configuration, the case contact portions in contact with the inner peripheral surface of the battery case cause the electrode contact portion to evenly press the electrode group. The battery thus configured can be improved in charge-discharge efficiency. When the two case contact portions are provided apart from the center in the width direction, the space between the electrode contact portion and the battery case can be increased. In this configuration the current, collecting terminal can be easily welded to the battery case and the electrolyte, solution can be easily filled. When the electrolyte solution is filled in the space surrounded with the two case contact portions, the electrolyte solution flows into two spaces adjacent to the space through the communicating portions. Accordingly, circulation of the electrolyte solution can be further improved.

The aspects of the present invention described above provide the cylindrical battery that has strength against increase in internal pressure of the battery, and does not require consideration of winding displacement in the electrode group. In the cylindrical battery, the electrode group is fixed in the battery case using the spacers and circulation of the electrolyte solution being filled can be improved.

A seventh aspect of the present invention preferably provides a cylindrical battery including: a battery case having a cylindrical shape; an electrode group disposed in the battery case, including a positive electrode, a negative electrode, and a separator, and having a pair of flat outer side surfaces opposed to each other, the negative electrode being exposed to the outer side surface; and a spacer disposed between an inner peripheral surface of the battery case and each of the outer side surfaces of the electrode group, the spacer having an electrode contact portion being substantially in entire contact with the outer side surface, wherein the electrode contact portion of the spacer has an area smaller than an area of the negative electrode exposed to the outer side surface.

In this configuration, the battery case accommodates the electrode group including the positive electrode, the negative electrode, and the separator and having the paired flat outer side surfaces opposed to each other it is thus possible to provide the battery that does not cause various problems due to winding displacement in the electrode group and related to the winding displacement. The spacers fixing the electrode group prevent movement of the electrode group relative to the battery case. This configuration suppresses separation of active materials in the plates and prevents deterioration in charge-discharge performance. Furthermore, the electrode contact portion of the spacer in contact with the negative electrode exposed to the outer side surface of the electrode group has the area smaller than the area of the exposed negative electrode. In the state where the electrode group is fixed by the spacer, the outer side surface of the negative electrode is partially exposed from the spacer. In this configuration, the negative electrode easily absorbs oxygen gas generated from the positive electrode during charging. It is thus possible to improve cycle life performance of the battery. The battery case having the cylindrical shape enhances strength against increase in internal pressure. Moreover, the outer side surface of the negative electrode is partially exposed from the spacer. This configuration allows the electrolyte solution to easily permeate the negative electrode.

According to an eighth aspect of the present invention, the electrode contact portion preferably has a width with respective to the center axis direction, and entire or part of the electrode contact portion has a width smaller than a width of the outer side surface of the negative electrode. When entirety or part of the width of the electrode contact portion is smaller than the width of the outer side surface of the negative electrode, the contact area of the spacer can be made smaller than the area of the outer side surface of the negative electrode. This configuration allows the end in the width direction of the outer side surface of the negative electrode to be exposed from the spacer, and facilitates absorption of oxygen gas. Furthermore, the spacer reliably presses the electrode group toward the center in the width direction.

According to a ninth aspect of the present invention, the electrode contact portion is preferably formed with one or a plurality of through holes. When the electrode contact portion is provided with the through hole, the contact area of the spacer can be made smaller than the area of the outer side surface of the negative electrode. This configuration allows the portion other than the end of the outer side surface of the negative electrode, to be exposed from the spacer, and facilitates absorption of oxygen gas. The through hole thus provided makes the contact area of the spacer smaller than the area of the outer side surface of the negative electrode. The outer shape of the spacer can thus substantially match the outer shape of the outer side surface of the negative electrode. The spacer can be made in contact with the end from which a negative active material is likely to separate, and it is thus possible to prevent, separation of the negative active material and to further prevent deterioration in charge-discharge performance.

According to a tenth aspect of the present invention, at least one of paired lateral sides, opposing in a width direction with respect to the center axis direction, of the electrode contact portion is preferably provided with one or a plurality of concave parts that are concave inward in the width direction. In order to prevent separation of the negative active material at the end in the width direction of the negative electrode as well as increase the area of the exposed outer side surface of the negative electrode, the plurality of concave parts are preferably provided. When the plurality of concave parts are provided, the adjacent concave parts form an intermediate portion therebetween, which is in contact with the end in the width direction of the negative electrode and thus prevents separation of the negative active material.

According to an eleventh aspect of the present invention, preferably, the electrode contact portion has an uneven surface facing the outer side surface of the negative electrode, the uneven surface has convex and concave parts, and the concave part is opened to at least one of end surfaces in the width direction or in the center axis direction. When the electrode contact portion has the uneven shape, the contact area of the spacer can be made smaller than the area of the outer side surface of the negative electrode. Furthermore, the concave part in the uneven shape is opened to at least one of the end surfaces in the width direction with respect to the center axis direction or in the center axis direction (in the height direction perpendicular to the width direction). This configuration allows oxygen gas generated from the positive electrode to reach the outer side surface of the negative electrode and to be absorbed. The electrode contact portion simply having the uneven shape prevents deterioration in mechanical strength of the electrode contact portion.

According to the aspects of the present invention described above, in the cylindrical battery that does not require consideration of winding displacement in the electrode group, the electrode group is fixed in the battery case using the spacers, oxygen gas generated during charging is easily absorbed by the negative electrode plate, and increase in internal pressure of the battery can be suppressed.

A twelfth, aspect of the present invention provides a cylindrical battery including: a battery case having a cylindrical shape; an electrode group disposed in the battery case, including a positive electrode, a negative electrode, and a separator, and having a pair of flat outer side surfaces opposed to each other, the negative electrode being exposed to the outer side surface; and a spacer disposed between an inner peripheral surface of the battery case and each of the flat outer side surfaces a the electrode group, wherein the spacer has a case contact portion and an electrode contact portion, the case contact portion extends continuously from a first axial end to a second axial end, is in contact with the inner peripheral surface of the battery case, and is provided with a communicating portion that communicates spaces partitioned by the case contact portion, and the electrode contact portion is substantially in entire contact with the outer side surface and has an area smaller than an area of the negative electrode exposed to the outer side surface.

in the cylindrical battery thus configured, the electrode group is fixed in the battery case using the spacers, and circulation of the electrolyte solution being filled can be improved. Furthermore, oxygen gas generated during charging is easily absorbed by the negative electrode plate and increase in internal pressure of the battery can be suppressed.

First Embodiment

A cylindrical battery according to an embodiment of the present invention is described below with reference to the drawings.

Figure 2:
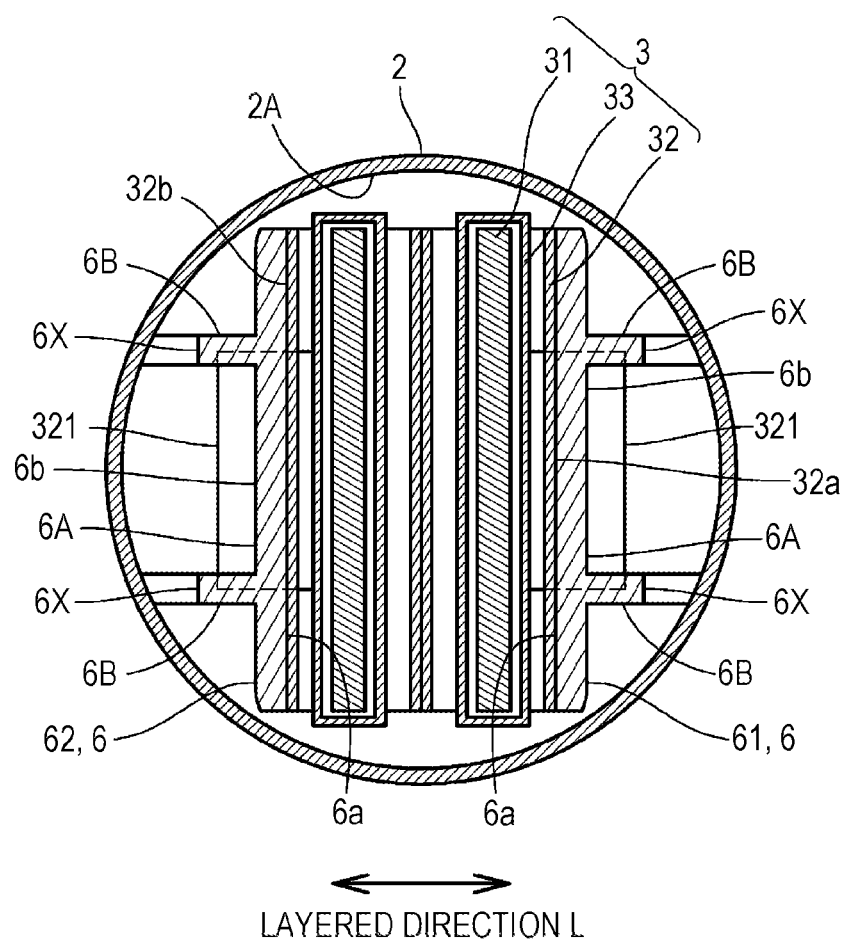
FIG. 2 shows a transverse sectional view of the cylindrical battery according to the first embodiment.

A cylindrical battery 100 according to the present embodiment is an alkaline storage battery such as a nickel-cadmium storage battery or a nickel-metal hydride storage battery. More specifically, as shown in FIGS. 1 and 2, the cylindrical battery 100 includes a metal battery case 2 having a bottomed cylindrical shape and an electrode group 3 that is located in the battery case 2. The electrode group 3 has a substantially rectangular parallelepiped shape, and includes a positive electrode plate 31, negative electrode plates 32, and a separator 33.

The battery case 2 is coated with nickel and has a bottomed cylindrical shape. As shown in FIG. 1, the battery case 2 has an upper opening that is sealed with a sealing member 5 with an insulating member 4 being interposed therebetween. The sealing member 5 has a rear surface to which a current collecting terminal 311 projecting from the upper end of the positive electrode plate 31 is connected by welding or the like directly or by way of a current collecting plate (not shown), so that the sealing member 5 functions as a positive terminal. As to be described later, in the present embodiment, the battery case 2 has a bottom surface 2B to which current collecting terminals 321 of the negative electrode plates 32 in the electrode group 3 is welded.

The electrode group 3 has the substantially rectangular parallelepiped shape, in which the positive electrode plate 31 and the negative electrode plates 32 are layered (stacked) with the separator 38, which is nonwoven fabric made of polyolefin or the like, being interposed therebetween. The separator 33 is impregnated therein with an electrolyte solution of potassium hydroxide or the like.

The positive electrode plate 31 includes a positive current collector made of foamed nickel and a mixture (hereinafter, simply referred to as a positive active material) of a nickel hydroxide active material and a cobalt compound serving as a conductive material. The positive active material is filled in pores of the positive current collector. The nickel hydroxide active material can be nickel hydroxide in the case of a nickel-cadmium storage battery, and can be nickel hydroxide including calcium hydroxide added thereto in the case of a nickel-metal hydride storage battery.

Figure 3:
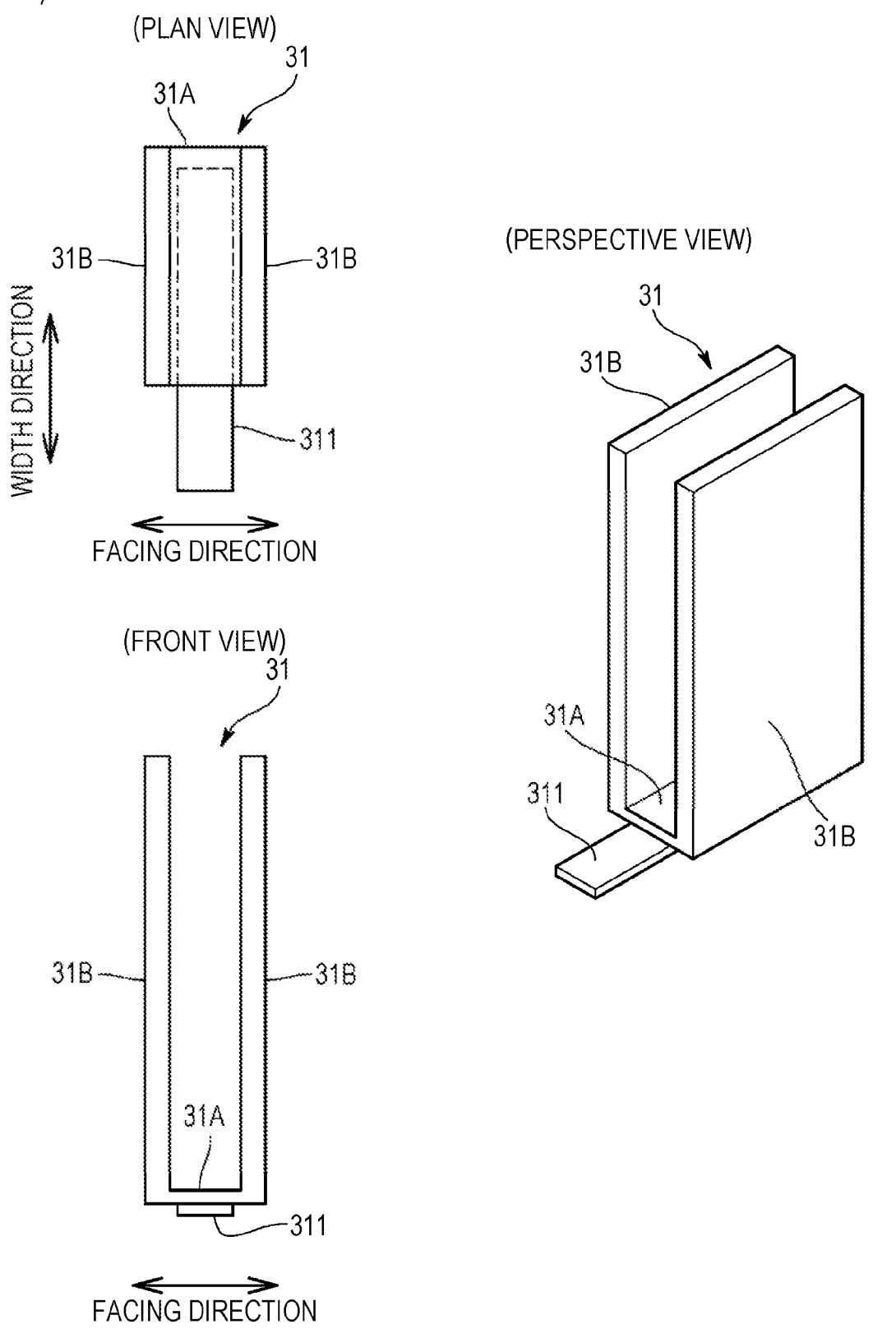
FIG. 3 shows a plan view, a front view, and a perspective view of a positive electrode plate according to the first embodiment.

More specifically, as shown in FIG. 3, the positive electrode plate 31 includes an active material non-inclusive portion 31A, which is linearly formed and includes no positive active material, and active material inclusive portions 31B, which are provided along the both sides of the active material non-inclusive portion 31A and includes the positive active material. The positive current collector of the positive electrode plate 31 is bent in a substantially U shape (more particularly, a substantially cornered U shape) at the active material non-inclusive portion 31A such that the active material inclusive portions 31B on the both sides face each other.

In the positive electrode plate 31, the active material non-inclusive portion 31A, which is located between the two active material inclusive portions 31B and configures a bent portion, is provided with the current collecting terminal 311 made of a nickel steel plate or the like. The current collecting terminal 311 extends outward in a direction along the width perpendicular to the facing direction of the two active material inclusive portions 31B.

The negative electrode plates 32 each include a negative current collector made of a flat punched steel plate coated with nickel and a negative active material applied on the negative current collector, for example. The negative, active material can be a mixture of powdered cadmium oxide and powdered metal cadmium in the case of a nickel-cadmium storage battery, and can be mainly powdered hydrogen storage alloy of the AB5 type (the rare earth system), the AB2 type (the Laves phase), or the like, in the case of a nickel-metal hydride storage battery.

Figure 4:
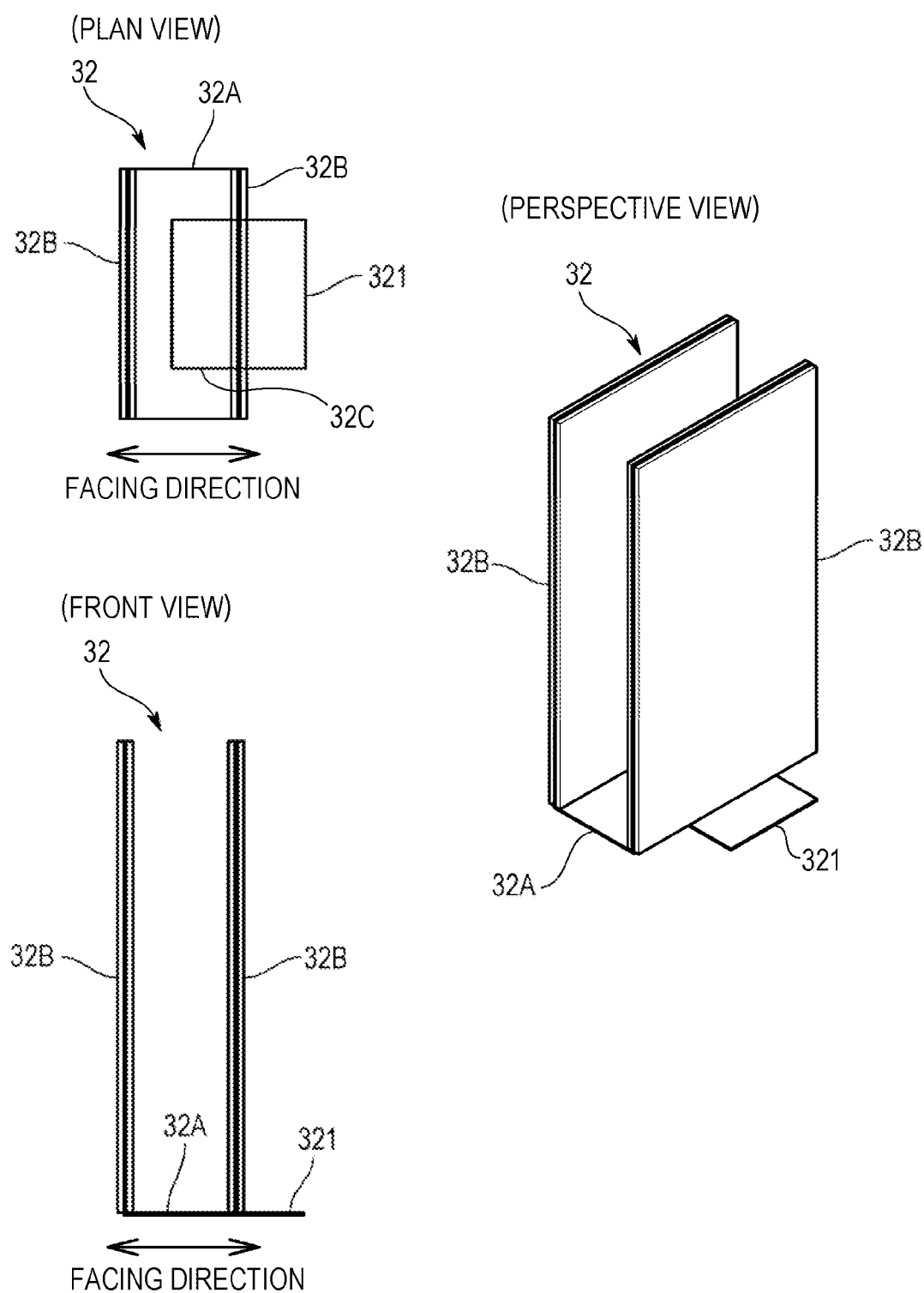
FIG. 4 shows a plan view, a front view, and a perspective view of a negative electrode plate according to the first embodiment.

More specifically, as shown in FIG. 4, the negative electrode plates 32 each include an active material non-inclusive portion (unapplied portion) 32A, which is linearly formed and includes no negative active material, and active material inclusive portions (applied, portions) 32B, which are provided along the both sides of the active material non-inclusive portion 32A and include the negative active material. The negative current collector of the negative electrode plate 32 is bent in a substantially cornered U shape at the active material non-inclusive portion 32A such that the active material inclusive portions 32B on the both sides face each other.

The negative electrode plate 32 is provided with the current collecting terminal 321 that is formed by bending part of the active material non-inclusive portion 32A outward and is to be connected by welding to the bottom surface 213 of the battery case 2. More specifically, a slit 32C is formed in the active material non-inclusive portion 32A so as to configure a desired shape of the current collecting terminal, and the current collecting terminal 321 is formed by bending outward an inner portion of the slit 32C.

Figure 5:
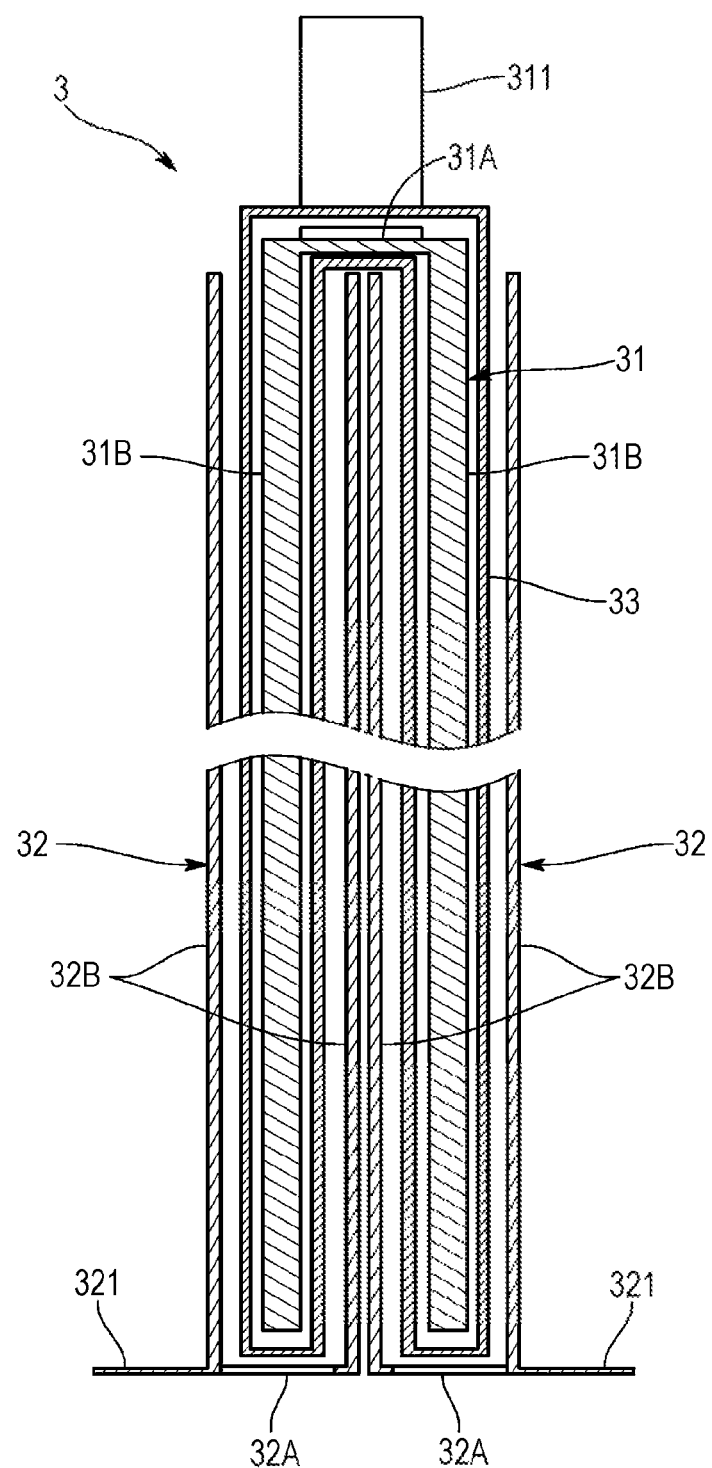
FIG. 5 shows a longitudinal sectional view of an electrode group according to the first embodiment.

In the electrode group 3 according to the present embodiment, the positive electrode plate 31, which has the substantially cornered U shape and includes the two active material inclusive portions 31B facing each other, and the negative electrode plates 112, each of which has the substantially cornered U shape and includes the two active material inclusive portions 32B facing each other, are layered such that they fit with each other. The positive electrode plate 31 is bent in the substantially cornered U shape while being sandwiched between the bent separator 33. More specifically, as shown in FIG. 5, the positive electrode plate 31 and the negative electrode plates 32 are layered such that one of the active material inclusive portions 31B of the positive electrode plate 31 is sandwiched between the two active material inclusive portions 32B of one of the negative electrode plates 32, and one of the active material inclusive portions 32B of each of the negative electrode plates 32 is sandwiched between the two active material inclusive portions 31B of the positive electrode plate 31. In the layers according to the present embodiment, the bent portion (the active material non-inclusive portion 31A) of the positive electrode plate 31 and the bent portion (the active material non-inclusive portion 32A) of each of the negative electrode plates 32 are opposed to each other. In FIGS. 1, 2, 5, and the like, the plates 31 and 32 and the separator 33 are spaced from each other for the purpose of easier comprehension, but are actually layered and in contact with each other.

More specifically, the electrode group 3 according to the present embodiment includes the two negative electrode plates 32 and the single positive, electrode plate 31. Respective ones of the active material inclusive portions 32B of the two adjacent negative electrode plates 32 (adjacent ones of the active material inclusive portions 32B of the two negative electrode plates 32) are sandwiched between the two active material inclusive portions 31B of the single positive, electrode plate 31. The electrode group 3 according to the present embodiment has outermost surfaces that are configured by entirely exposed outer side surfaces 32a and 32b of the negative electrode plates 32. As shown in FIGS. 1 and 2, the electrode group 3 is accommodated in the battery case 2 such that a layered direction L thereof is perpendicular to a center axis direction C of the battery case 2.

As shown in FIGS. 1 and 2, the cylindrical battery 100 according to the present embodiment includes spacers 6 for fixing the electrode group 3. The spacers 6 include paired spacers 61 and 62 that are interposed between an inner peripheral surface 2A of the battery case 2 and the outer side surfaces of the electrode group 3 and fix the electrode group 3 in the battery case 2. The paired spacers 61 and 62 are located in spaces between the inner peripheral surface 2A of the battery case 2 and the outer side surfaces of the electrode group 3, respectively, so as to sandwich the electrode group 3 in the layered direction L. The layered direction L corresponds to the facing directions of the active material inclusive portions 31B and 32B of the plates 31 and 32, respectively.

The paired spacers 61 and 62 are made of resin such as acrylic resin, polypropylene resin, or nylon resin, or are made of metal such as stainless steel, and have the same shapes.

Figure 6:
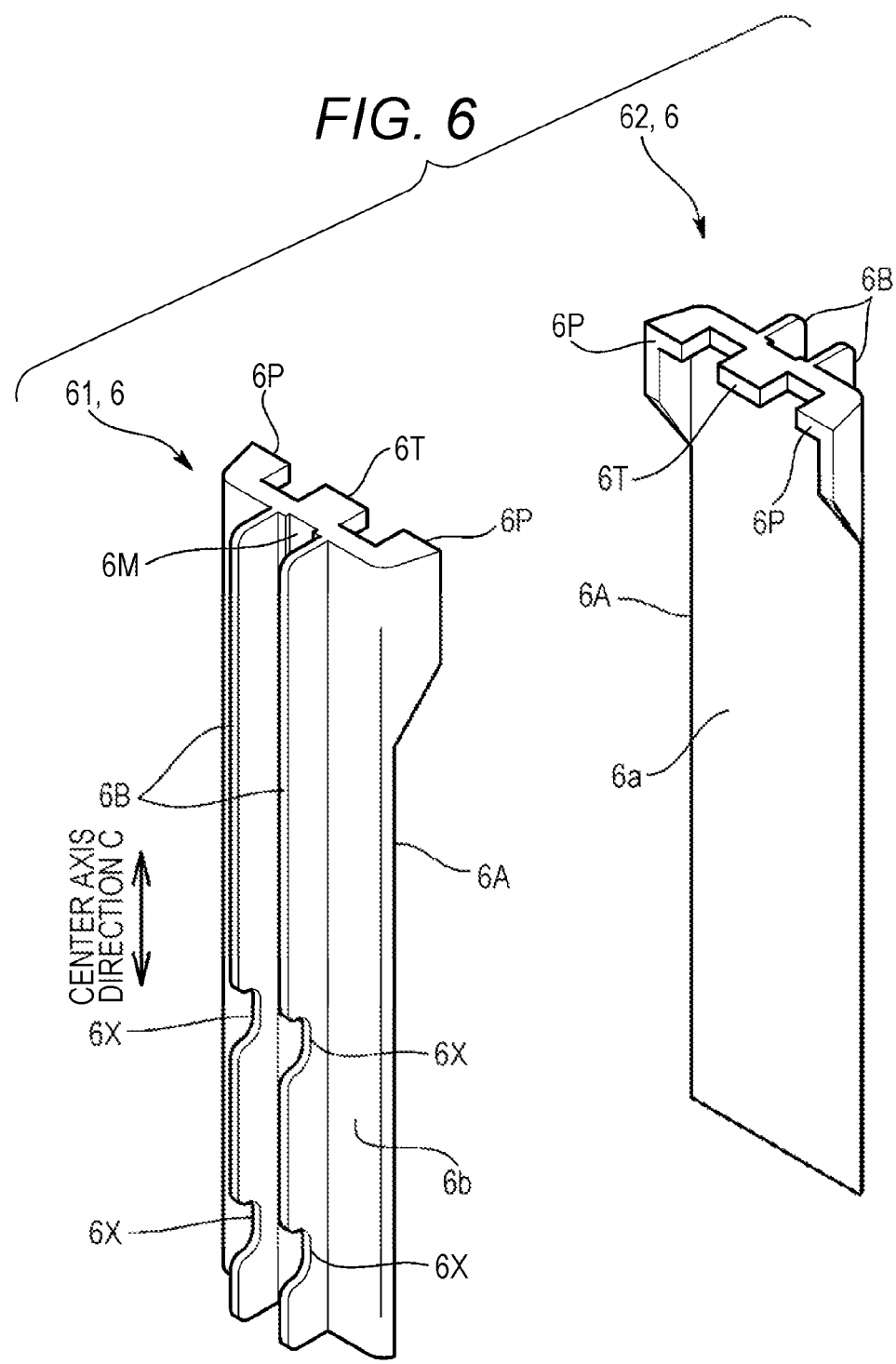
FIG. 6 shows a perspective view of spacers according to the first embodiment.

As shown in FIGS. 1, 2, and 6, the spacers 61 and 62 each have an electrode contact portion 6A and two case contact portions 6B. The electrode contact portion 6A has a rectangular flat plate shape and a first surface 6a serving as a contact surface with the outermost surface (more particularly, the outer side surface 32a or 32b of corresponding one of the negative electrode plates 32) of the electrode group 3 in the layered direction L. The two case contact portions 6B extend from a second surface 6b of the electrode contact portion 6A and are in contact with the inner peripheral surface 2A of the battery case 2.

The electrode contact portion 6A is shaped so as to be along the outermost surface of the electrode group 3 in the layered direction L. As shown in FIGS. 1 and 6 to 8, the electrode contact portion 6A is provided, at the top at a first axial end, with a projection 6T that faces the top surface of the electrode group 3. The projection 6T extends substantially perpendicularly from the center at the upper end of the electrode contact portion 6A. The projection 6T is in contact with the current, collecting terminal 311 that extend upward from the top surface of the electrode group 3 so as to prevent displacement of the current collecting terminal 311 and to prevent damage and peeling off at the welded portion of the current collecting terminal 311.

Figure 7:
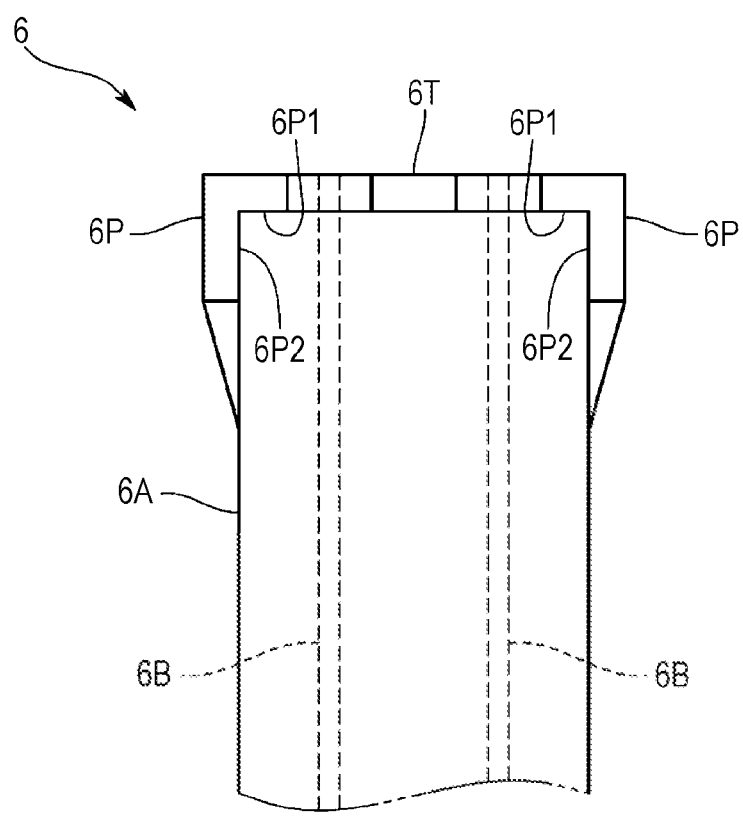
FIG. 7 shows a partially enlarged front view of the spacer according to the first embodiment.
Figure 8:
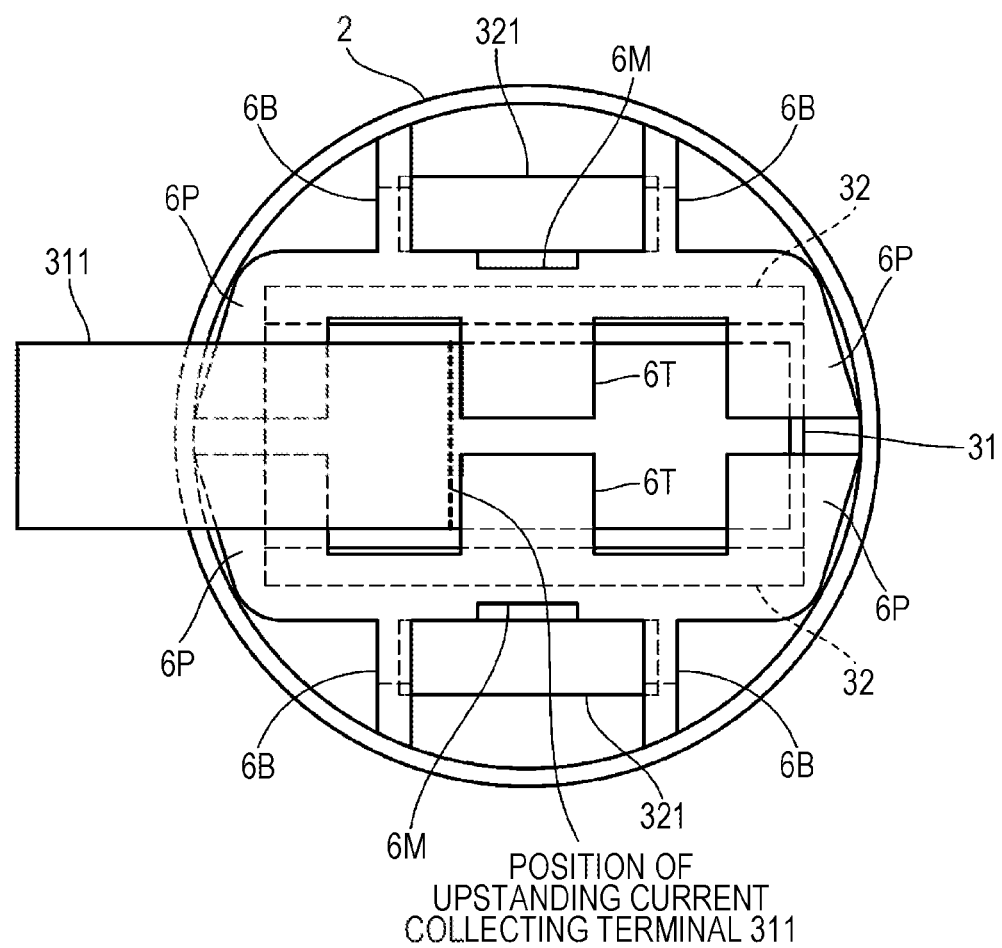
FIG. 8 shows a view in a state where a battery case accommodates the spacers and the electrode group according to the first embodiment.

As shown in FIGS. 6 to 8, the electrode contact portion 6A is provided, at upper corners, with surrounding walls 6P that respectively surround the upper corners of the electrode group 3. The surrounding walls 6P each have an upper wall 6P1 facing the top surface of the electrode group 3 and a side wall 6P2 facing corresponding one of right and left side surfaces of the electrode group 3 (see. FIG. 7). The surrounding walls 6P prevent contact between the battery case 2 and the positive electrode plate 31 and prevent contact between the current collecting terminal 311 of the positive electrode plate 31 and the negative electrode plates 32. The surrounding walls 6P also prevent displacement of the positive electrode plate 31 and the negative electrode plates 32 in the electrode group 3. The surrounding walls 6P thus provided eliminate necessity for provision of an upper insulating plate, which has been conventionally required. This leads to simplified production steps and reduction in material cost.

The two case contact portions SB are provided on the second surface 6b of the electrode contact portion 6A so as to be parallel to each other along the center axis direction C. More specifically, the case contact portions 6B are provided symmetrically with respect to the center axis of the battery case 2 in the state of being accommodated in the battery case 2. The case contact portions 6B each have a contact portion (a tip end surface of a free end side) that is in contact with the inner peripheral surface 2A of the battery case 2. The contact portion has a curved surface substantially identical with the curved inner peripheral surface 2A of the battery case 2. The case contact portions 6B and the battery case 2 are accordingly in surface contact with each other (see FIGS. 2 and 8). Each of the case contact portions 6B is provided on the second surface 6b of the electrode contact portion 6A so as to extend continuously from the top at the first axial end to the bottom at a second axial end (see FIGS. 1 and 6).

As shown in FIG. 8, when the two spacers 6 are located so as to sandwich the electrode group 3 in the battery case 2, the projections 6T of the spacers 6 are in contact with or press the current collecting terminal 311 of the positive electrode plate 31. The current collecting terminal 311 has a free end that is not in contact with the projections 6T and is bent to be welded to the sealing member 5. The position where the current collecting terminal 311 upstands is in the vicinity of the projections ST. Furthermore, the surrounding walls 6P of the two spacers 6 accommodate the upper corners of the positive electrode plate 31 and the negative electrode plates 32. The electrode contact portion 6A and the case contact portions SB form a concave part therebetween serving as a welded space, which enables the current, collecting terminals 321 of the negative electrode plates 32 to be welded to the bottom surface 2B of the battery case 2.

The case contact portions 6B are in contact with the inner peripheral surface 2A of the battery case 2 from the top to the bottom in the state where the spacers are accommodated in the battery case 2. The case contact portions 6B partition the space formed between the outer side surfaces of the electrode group 3 and the inner peripheral surface 2A of the battery case 2. Each of the case contact portions 6B is provided on both sides with vertically communicated spaces (see FIGS. 1 and 2). Each of the spacers (31 and 62 according to the present embodiment has the two case contact portions 6B, so as to form three spaces partitioned by the two case contact portions 6B and the inner peripheral surface 2A of the battery case 2.

As shown in FIGS. 1, 2, and 6, each of the case contact portions 6B according to the present embodiment has communicating portions 6X that communicate the spaces partitioned by the case contact portion 6B.

The communicating portions 6X communicate the spaces, which are adjacent with the case contact portion 6B being interposed therebetween, as to facilitate movement of liquid in the adjacent spaces and facilitate circulation of the electrolyte solution. The communicating portions 6X are provided at a plurality of positions in the axial direction on the free end side (the portion in contact with the inner peripheral surface 2A of the battery case 2) of each of the case contact portions 6B. The communicating portions 6X according to the present embodiment are provided at two positions in the lower half of each of the case contact portions 6B. The communicating portions 6X located in the lower half of each of the case contact portions 6B allow the electrolyte solution filled at one time to flow into a different adjacent space through the communicating portions 6X before the electrolyte solution overflows from the upper opening of the battery case 2. In this manner, overflow of the electrolyte solution can be prevented.

More specifically, the communicating portions 6X are concave parts formed on the free end side. Which is in contact with the inner peripheral surface 2A of the battery case 2, of each of the case contact portion 6B. The two concave parts 6X provided at each of the case contact portions 6B connect a first side surface and a second side surface of the case contact portion 6B and have the same shapes. The concave parts 6X each have depth smaller than an extending length of the case contact portion 6B. In other words, the concave parts 6X are formed so as not to be continuous to the electrode contact portion 6A. The extending length of the case contact portion 6B corresponds to a length from the proximal end continuous to the electrode contact portion 6A to the free end in contact with the battery case 2. The concave parts 6X and the inner peripheral surface 2A of the battery case 2 form communicating spaces. When the electrolyte solution is filled in a predetermined space partitioned by the case contact portions 6B, the electrolyte solution in the space is likely to flow along the inner peripheral surface 2A of the battery case 2 into a different adjacent space.

The concave parts 6X provided at the two case contact portions 6B are located at the same vertical positions. When the electrolyte solution is filled in a space provided between the two case contact portions 6B, the electrolyte solvation flows into adjacent spaces on both sides in similar manners. This prevents the electrolyte solution from flowing into only one of the adjacent spaces and causing an uneven state.

In the present embodiment, the electrode contact portion 6A has a recess 6M on the second surface 6b at the upper end of the portion sandwiched between the two case contact portions 6B. The recess GM allows a solution filling nozzle (not shown) for filling the electrolyte solution to be inserted thereinto (see FIGS. 1 and 6). The recess 6M is provided between the two case contact portions 6B and extends for a predetermined distance from the top surface of the electrode contact portion 6A. The recess 6M has an inner bottom surface provided as a slant surface 6Ma that guides downward the electrolyte, solution ejected from the solution filling nozzle. The inner bottom surface provided as the slant surface 6Ma of the recess GM prevents the electrolyte solution ejected from the solution filling nozzle from hitting the inner bottom surface and scattering outward from the battery case 2.

Briefly described next is a method of producing the cylindrical battery 100 thus configured.

The electrode group 3 described above is sandwiched between the paired spacers 61 and 62 in the layered direction L. An assembly thus obtained is located in the battery case 2. In this state, the current collecting terminal 321 of each of the negative electrode plates 32 is positioned between the two case contact portions 6B of corresponding one of the paired spacers 61 and 62, and the bottom surfaces of the case contact portions 6B of the corresponding one of the spacers 61 and 62 partially press the current collecting terminal 321 toward the bottom surface 2B of the battery case 2. Alternatively, the paired spacers 61 and 62 can be accommodated after the electrode group 3 is accommodated in the battery case 2, so as to sandwich the electrode group 3.

In the state where the electrode group 3 is fixed in the battery case 2, a welding rod is inserted into a space formed between the case contact portions 6B of each of the spacers 61 and 62 and the inner peripheral surface 2A of the battery case 2, so that the current collecting terminal 321 of each of the negative electrode plates 32 is connected by welding to the bottom surface 2B of the battery case 2. The electrolyte solution is then filled in the battery case 2.

The electrolyte solution is filled in the space formed between the two case contact portions 6B of one of the spacers, e.g. the spacer 61, and the tip end of the solution filling nozzle is inserted into the recess 6M. The electrolyte solution ejected from the solution filling nozzle is guided downward along the slant surface 6Ma of the recess 6M and flows into the space between the two case contact portions 6B. The electrolyte solution thus filled passes through the communicating portions 6X provided at the two case contact portions 6B and flows into the two different adjacent spaces by way of the case contact portions 6B. The electrolyte solution having flown into the two different adjacent spaces passes through the space between the electrode group 3 and the battery case 2, reaches the other spacer 62, and flows into the space formed between the two case contact portions 6B of the spacer 62 through the communicating portions 6X of the case contact portions 6B of the spacer 62. The electrolyte solution being filled can be circulated quickly, and the electrolyte solution filled once can be spread in the battery case 2. After the electrolyte solution filling, the current collecting terminal 311 of the positive, electrode plate 31 is connected to the rear surface of the sealing member 5 directly or by way of the current collecting plate (not shown). The sealing member 5 is fixed by swaging or the like to the upper opening of the battery case 2 with the insulating member 4 being interposed therebetween.

Effects of First Embodiment

In the cylindrical battery 100 according to the present embodiment thus configured, the battery Case 2 accommodates the electrode group 3 in which the positive electrode plate 31 and the negative electrode plates 32 are layered with the separator 33 being interposed therebetween. The battery thus provided does not cause the various problems due to winding displacement in the electrode group 3 and related to the winding displacement. The cylindrical shape of the battery case 2 enhances strength against increase in internal pressure.

Furthermore, the spacers 61 and 62 presses and fix the electrode group 3 in the battery case 2 so as to prevent, movement of the electrode group 3 relative to the battery case 2. This configuration suppresses separation of the active materials in the plates 31 and 32, prevents deterioration in charge-discharge performance, and rather improves the charge-discharge performance.

The case contact portions 6B of the spacers 61 and 62 are provided with the communicating portions (concave parts) 6X that communicate the spaces partitioned by the case contact portions 6B. When the electrolyte solution is filled in one of the spaces partitioned by the case contact portions 6B, the filled electrolyte solution flows into the other space through the communicating portions (concave parts) 6X. In this manner, circulation of the electrolyte solution is improved. Even if a predetermined amount of the electrolyte solution to be filled in the battery case 2 is filled at one time, the electrolyte solution can be prevented from overflowing from the battery case 2. Furthermore, there is no need to fill the electrolyte solution gradually for several times, thereby enhancing workability of electrolyte, solution filling. Moreover, the case contact portions 6B are provided on the second surface 6b of the electrode contact portion 6A so as to extend continuously from the first axial end to the second axial end. The spacers 61 and 62 are thus improved in mechanical strength, and it is possible to facilitate the work during assembling the cylindrical battery 100, for example.

Other Modified Embodiments

It is noted that the present invention is not limited to the embodiment described above.

Figure 9:
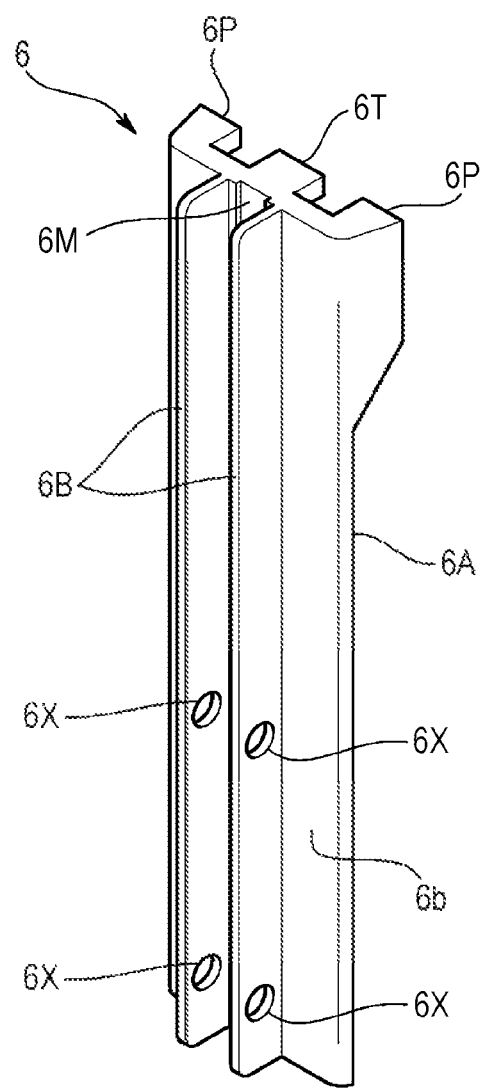
FIG. 9 shows a perspective view of spacers according to a modification example of the first embodiment.

For example, in the embodiment described above, the communicating portions 6X of the case contact portions 6B are provided as the concave parts on the free end sides. As shown in FIG. 9, the communicating portions may be provided as through holes in the case contact portions 6B. These through holes penetrate the case contact portions 6B in the thickness direction so as to be opened in the first side surface and the second side surface of each of the case contact portion 6B. The communicating portions 6X provided as the through holes allows the free end side of the case contact portion 6B to be substantially in entire contact with the inner peripheral surface 2A of the battery case 2. The spacers 61 and 62 thus fix the electrode group 3 more reliably. Furthermore, the free end side of each of the case contact portions 6B is not provided with any concave part. This configuration facilitates the work of inserting the spacers 61 and 62 into the battery case 2 when assembling the cylindrical battery.

Still alternatively the communicating portions 6X of the case contact portions 6B can include both of the concave part and the through hole. This configuration further improves circulation of the electrolyte solution.

In the embodiment described above, the concave parts serving as the communicating portions 6X are provided on the free end side of each of the case contact portions 6B. Alternatively the concave parts can be provided on the lower side of the case contact portion 6B.

Each of the concave parts can have a cornered U shape, a partially circular shape such as a semicircular shape, a V shape, or a U shape, in a side view.

The plural communicating portions 6X of the case contact portion 6B have the same shapes. Alternatively, the communicating portions 6X can have different shapes. The communicating portions 6X of the plurality of case contact portions 6B can also have different shapes. Moreover, the communicating portions 6X of the plurality of case contact portions 6B can be located at different vertical positions.

The number of the communicating portions 6X in each of the case contact portions 6B is not limited to two, but can be one, or three or more.

Second Embodiment

A cylindrical battery 200 according to a second embodiment is configured similarly to the cylindrical battery 100 according to the first embodiment, except that an electrode contact portion 7A and case contact portions 7B of each of spacers 71 and 72 are configured differently. The description of the constituent elements in the first embodiment except for the electrode contact portion 7A and the case contact portions 7B can be thus incorporated in the present embodiment.

The spacers 71 and 72 according to the second embodiment have areas of contact surfaces (hereinafter, referred to as contact areas) with the outer side surfaces 32a and 32b of the negative electrode plates 32, which contact areas are smaller than the areas of the outer side surfaces 32a and 32b of the negative electrode plates 32.

Figure 10:
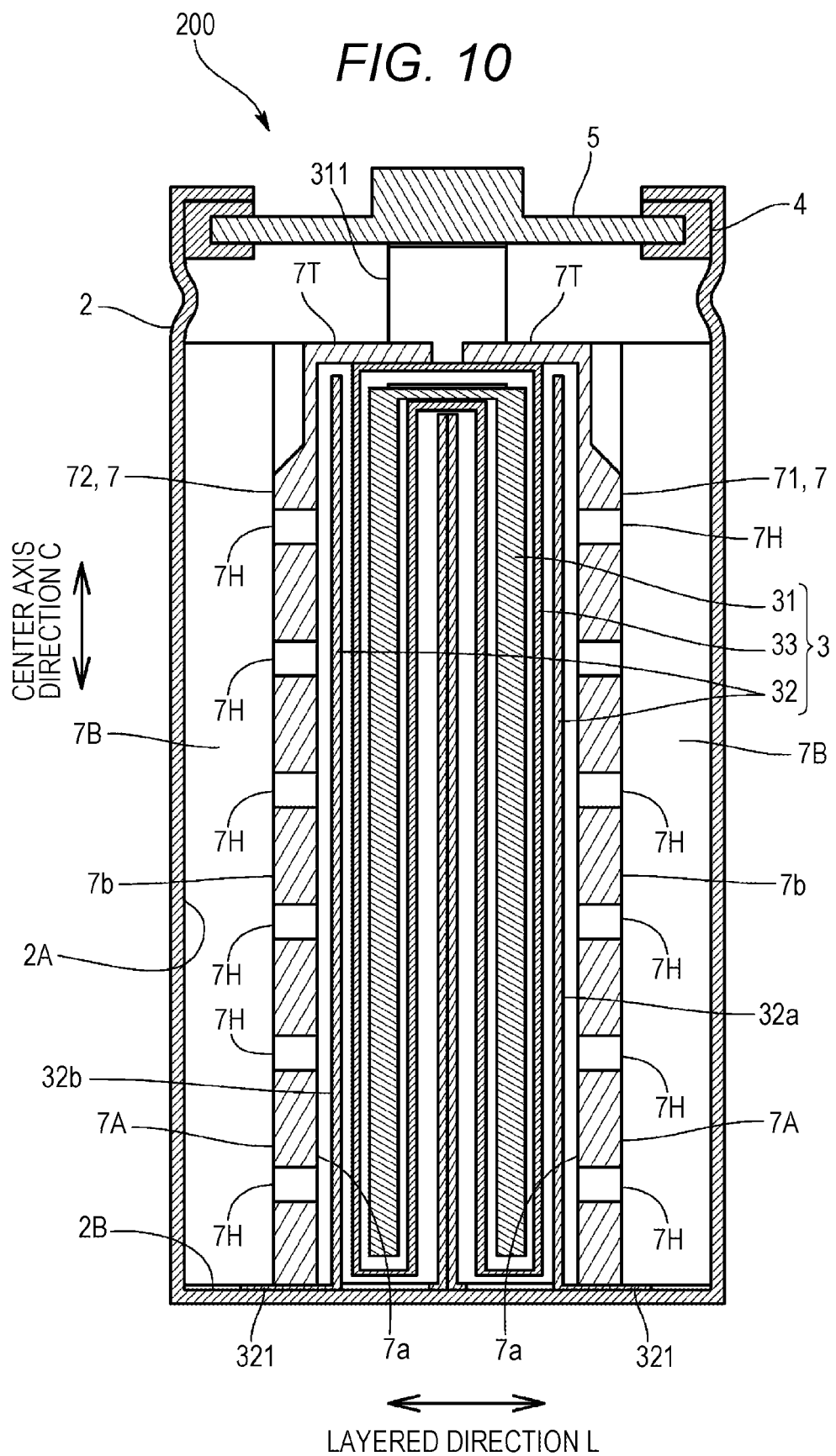
FIG. 10 shows a longitudinal sectional view of a cylindrical battery according to a second embodiment.
Figure 11:
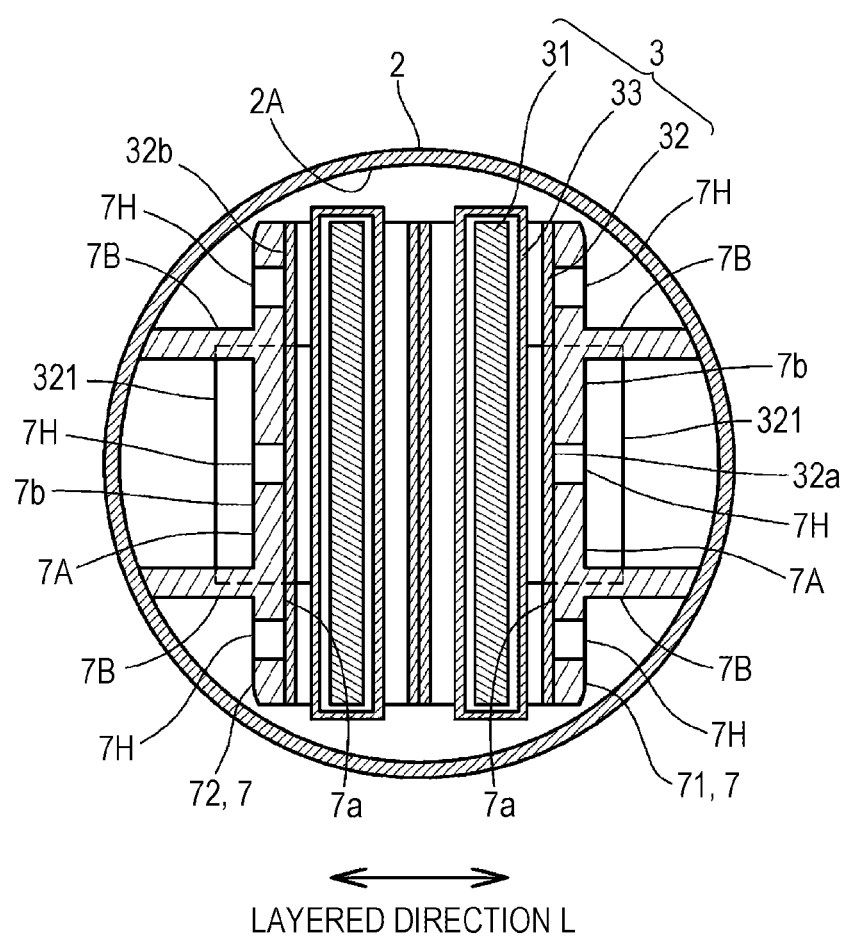
FIG. 11 shows a transverse sectional view of the cylindrical battery according to the second embodiment.
Figure 12:
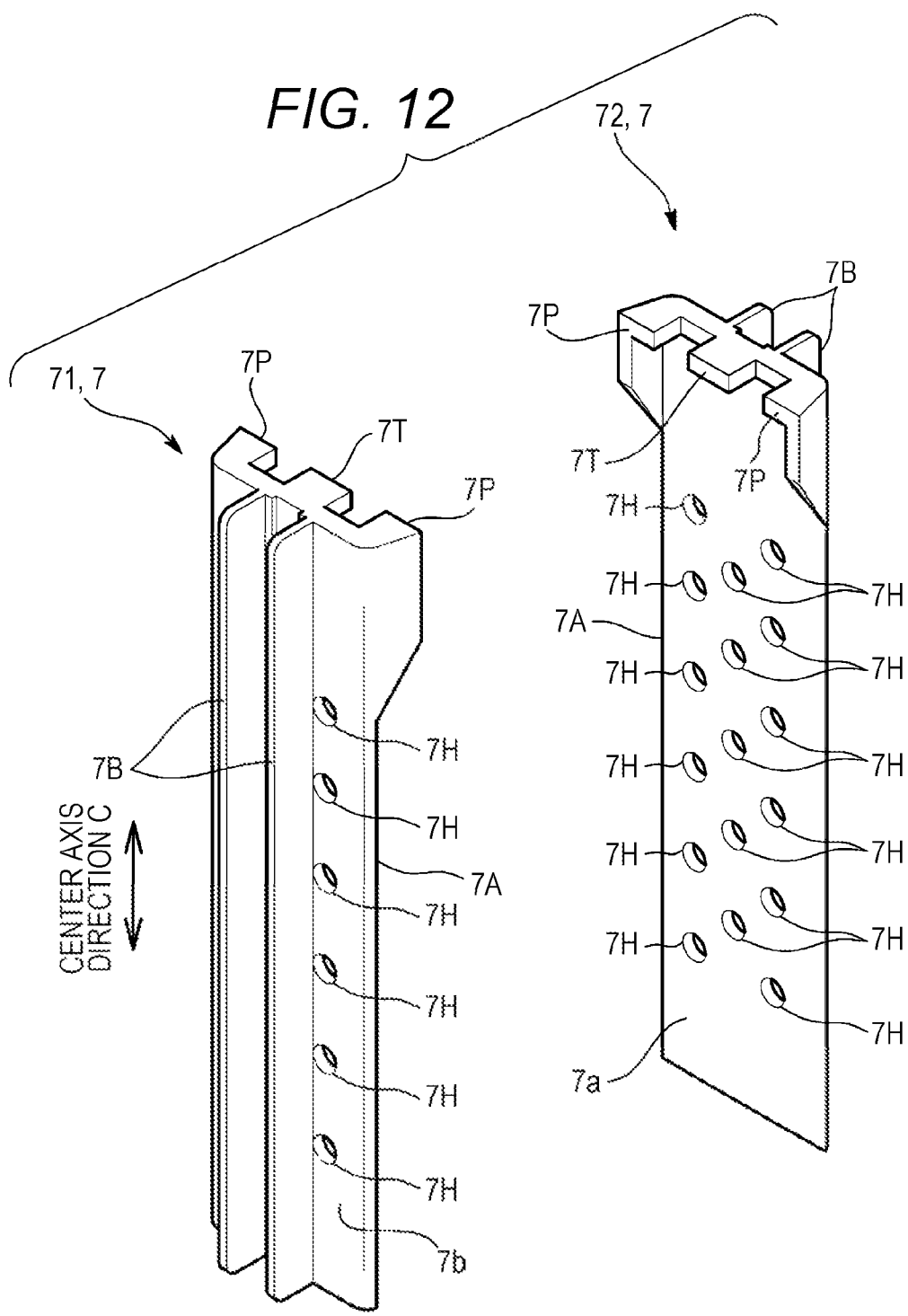
FIG. 12 shows a perspective view of spacers according to the second embodiment.

More specifically, as shown in FIGS. 10 to 12, the electrode contact portion 7A is provided with a plurality of through holes 7H that penetrate in the thickness direction, so that the contact area of a first surface 7a of the electrode contact portion 7A is smaller than the areas of the outer side surfaces 32a and 32b of the negative electrode plates 32. Due to the contact area reduced by the through holes 7H, the outer shape of the first surface 7a in a planar view substantially match the outer shapes of the outer side surfaces 32a and 32b of the negative, electrode plates 32 in a planar view. It is thus possible to prevent separation of the negative active material at the ends of the negative electrode plates 32.

Figure 13:
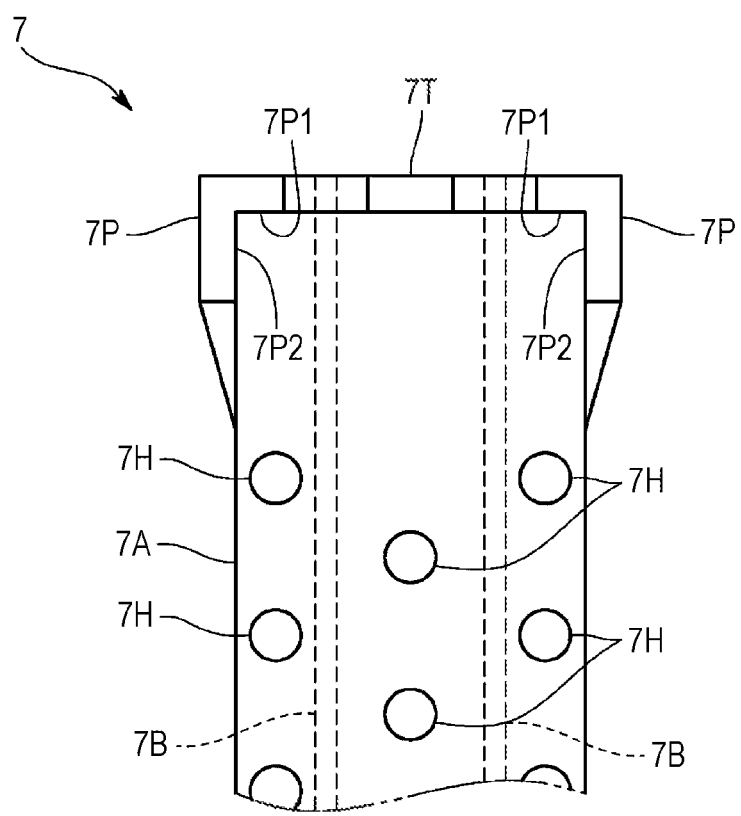
FIG. 13 shows a partially enlarged front view of the spacer according to the second embodiment.
Figure 14:
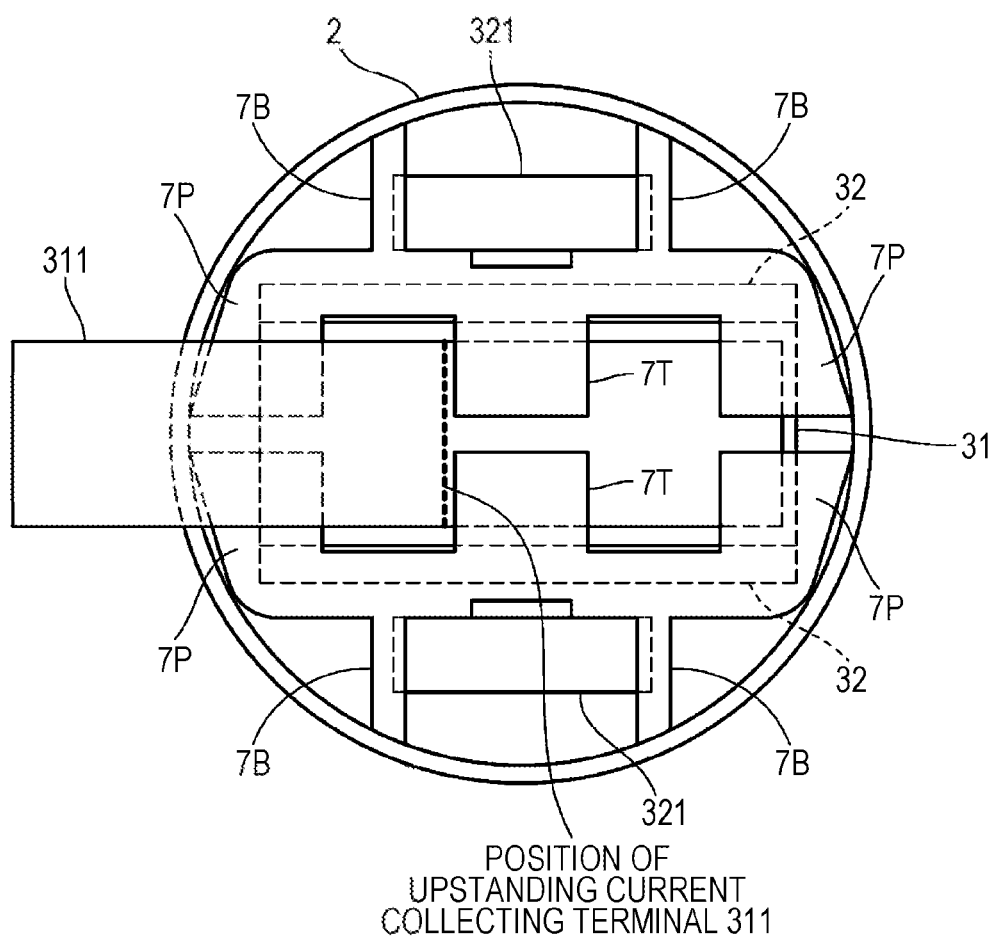
FIG. 14 shows a view in a state where a battery case accommodates the spacers and an electrode group according to the second embodiment.

The plurality of through holes 7H are provided in the electrode contact portion 7A on the both sides of each of the case contact portions 7B (see FIGS. 12 and 13). The through holes 7H provided on the both sides of the case contact portion 7B, allow oxygen gas in each of spaces partitioned by the case contact portion 7B to be absorbed by the negative electrode plate 32 through the through holes 7H, and allow the electrolyte solution in the space to permeate the negative electrode plate 32 through the through holes 7H.

Effects of Second Embodiment

In the cylindrical battery 200 according to the present embodiment thus configured, the planar outer side surfaces of the electrode group 3 are configured by the outer side surfaces 32a and 32h of the negative electrode plates 32, and the contact areas of the spacers 71 and 72 with the outer side surfaces 32a and 32b of the negative electrode plates 32 are smaller than the areas of the outer side surfaces 32a and 32b of the negative electrode plates 32. Accordingly, in the state where the spaces 71 and 72 fix the electrode group 3, the outer side surfaces 32a and 32b of the negative electrode plates 32 are partially exposed from the spacers 71 and 72. This configuration allows oxygen gas generated from the positive, electrode plate 31 during charging to be easily absorbed by the negative electrode plates 32. Increase in internal pressure of the battery is thus prevented, and the cylindrical battery 200 can be improved in cycle life performance. The cylindrical shape of the battery case 2 enhances strength against, increase in internal pressure. Furthermore, the outer side surfaces 32a and 32b of the negative electrode plates 32 are partially exposed from the spacers 71 and 72. This configuration allows the electrolyte solution to easily permeate the negative electrode plates 32.

In the present embodiment, due to the through holes 7H provided in the electrode contact portions 7A, the contact areas of the spacers 71 and 72 are made smaller than the outer side surfaces 32a and 32b of the negative electrode plates 32, and the outer shapes of the electrode contact portions 7A substantially match the outer shapes of the outer side surfaces 32a and 32b of the negative electrode plates 32. The ends, which are likely to cause separation of the negative active material, are made in contact with the electrode contact portions 7A so as to prevent separation of the negative active material. It is possible to further prevent deterioration in charge-discharge performance.

Other Modified Embodiments

It is noted that the present invention is not limited to the embodiment described above.

In the aspect in which the contact areas of the spacers 71 and 72 are smaller than the areas of the outer side surfaces 32a and 32b of the negative electrode plates 32, other than the embodiment described above, as shown in FIG. 15, the first surface 7a can partially have, width smaller than the width of each of the outer side surfaces 32a and 32b of the negative electrode plates 32.

Figure 15:
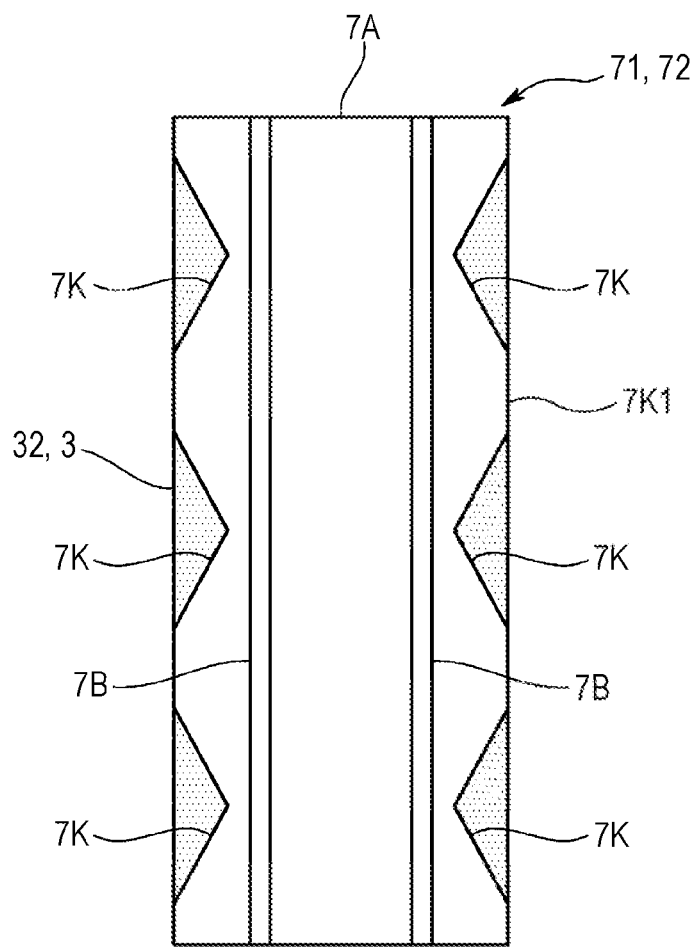
FIG. 15 shows a schematic view of a spacer according to a modification example of the second embodiment.

Each of the spacers 71 and 72 shown in FIG. 15 is provided with a plurality of concave parts 7K that are concave inward in the width direction, on each of paired lateral sides opposing in the width direction with respect to the center axis direction of the electrode contact portion 7A, in this configuration, the contact areas of the spacers 71 and 72 with the outer side surfaces 32a and 32h of the negative electrode plates 32 are smaller than the areas of the outer side surfaces 32a a ld 39h of the negative electrode plates 32. More specifically, in the outer shape of the electrode contact portion 7A in a planar view, the concave parts 7K are provided so as to be concave inward from the outer side surfaces 32a and 32b of the negative electrode plates 32. The plurality of concave parts 7K thus provided increase the areas of the exposed outer side surfaces 32a and 32b of the negative electrode plates 32. The adjacent concave parts 7K form an intermediate portion 7K1 therebetween, which is in contact with the end in the width direction of the negative electrode plate 32 and thus prevents separation of the negative active material. The concave parts 7K shown in FIG. 15 each have a V shape in a planar view. The concave parts 7K are not limited thereto in terms of the shapes, but each can have a cornered U shape, a partially circular shape such as a semicircular shape, or a U shape.

Figure 19:
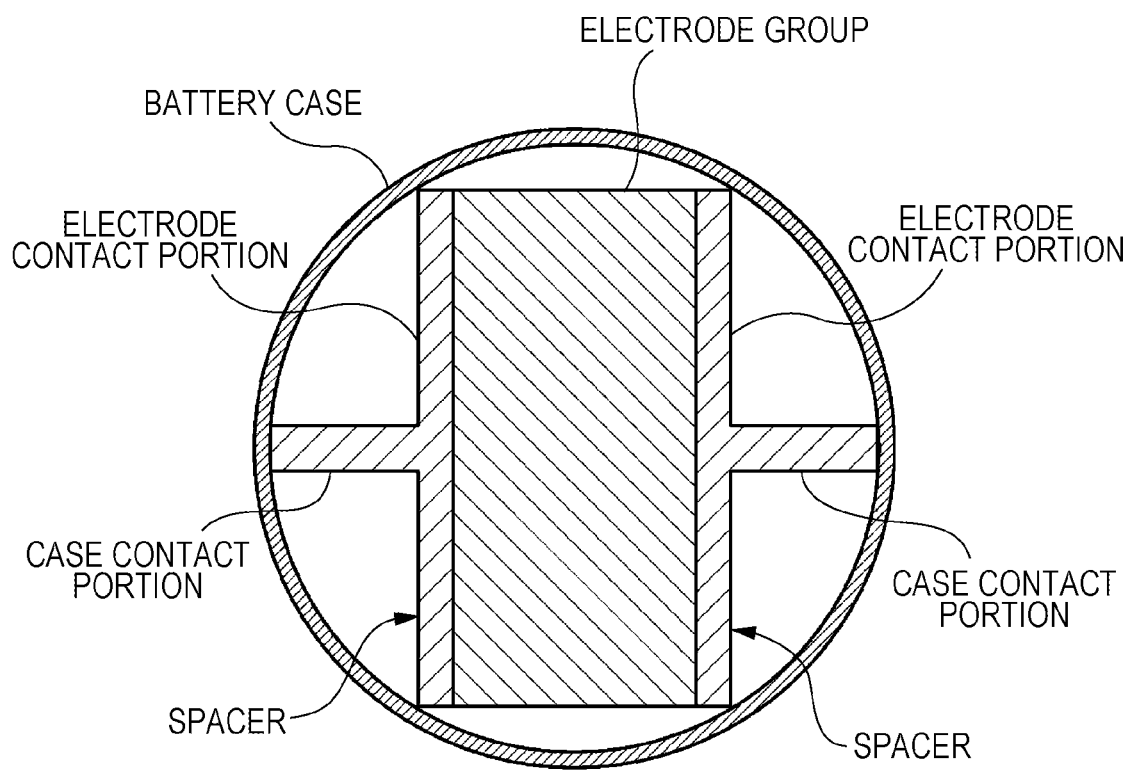
FIG. 19 shows a sectional view of exemplary spacers having basic configurations according to the present invention.

There were produced a battery including spacers that have contact areas equal to areas of outer side surfaces of negative electrode plates as shown in FIG. 19 (comparative example), a battery including the spacers shown in FIG. 12 according to the above embodiment (the present invention A), and a battery including the spacers shown in FIG. 15 (the present invention 13), and gas absorbency was evaluated in each of these batteries. The following table indicates results of the evaluation tests.

The batteries respectively including the corresponding spacers were produced in the following manner. In order to obtain a positive active material, nickel hydroxide containing 3% by mass of zinc and 0.6% by mass of cobalt in a solid solution was coated with 7% by mass of a hydroxide of cobalt, and was then oxidized with air for one hour at 110° C. using a sodium hydroxide solution of 18 M. An aqueous solution of a thickener (carboxymethyl-cellulose) was added to the positive active material so as to obtain a paste. The paste was filled, in foamed nickel having the substrate surface density of 500 g/m2 and was dried. The foamed nickel thus obtained was then pressed so as to have predetermined thickness. There was thus prepared a positive electrode plate of 1000 mAh.

Prepared as a negative active material was hydrogen storage alloy having the composition of $MmNi_{3.8}Co_{0.8}Mn_{0.3}Al_{0.3}$ and crushed into an average particle size of 50 μm (Mm indicates misch metal). An aqueous solution of a thickener (methylcellulose) was added to 100 parts by mass of the powdered alloy, and 1 part by mass of a binder (styrene-butadiene rubber) was further added thereto. The paste thus obtained was applied to both surfaces of a punched steel plate of 45 μm thick. The steel plate thus obtained was pressed so as to have predetermined thickness. There were thus prepared negative electrode plates of 600 mAh each, or 1200 mAh in total. It is noted that the average particle size corresponds to a particle size at the cumulative frequency of 50% in the volume standard particle size distribution, and is measured using a measurement device (MT3000 manufactured by Micro Track Co., Ltd.) according to the laser diffractometry and scattering method.

The positive electrode plate and the negative electrode plates prepared as described above were layered with a sulfonated separator being interposed therebetween as shown in FIG. 5 so as to form an electrode group. The electrode group combined with the spacers was inserted into a cylindrical metal case. The metal case was then filled with 1.45 g of an electrolyte, solution having the composition of 4M KOH+3M NaOH+0.8M LiOH, and an opening of the metal case was sealed with a metal cover having a safety valve, so as to obtain a nickel-metal hydride storage battery of 1000 mAh in the AA size.

The batteries thus assembled were subject to initial formation under the following conditions and were completed. Constant current charging was conducted with 100 mA at 20° C. for twelve hours, and then constant current discharging was conducted at 200 mA to 1 V. This cycle was repeated twice. The batteries were then left at 40° C. for 48 hours. Constant current charging was conducted with 100 mA at 20° C. for twelve hours, and then constant current discharging was conducted at 200 mA to 1 V. This cycle was repeated twice, and the initial formation was completed.

The evaluation tests were conducted in the following manner with the respective batteries thus completed. More specifically, each of the batteries was charged with 0.5 C at 20° C. to the SOC 1.20% and internal pressure of the battery was measured. The aperture ratio in the present invention A is 2.5%, whereas the aperture ratio in the present invention B is 9%. The aperture ratio herein indicates a percentage of opened areas of through holes or concave parts in a planar view relative to the contact area in the comparative example.

TABLE 1

| | Aperture ratio [%] | Internal pressure when charged to 120% (0.5 C at 20° C.) [MPa] |
|---|---|---|
| Comparative example | 0 | 1.04 |
| The present invention A | 2.5 | 0.92 |
| The present invention B | 9 | 0.86 |

As apparent from Table 1, the cylindrical battery according to the comparative example has the internal pressure of 1.04 [MPa] after overcharging, whereas the cylindrical battery according to the present invention A and the cylindrical battery according to the present invention B each have internal pressure after overcharging lower than that of the comparative example. This means that oxygen gas generated during charging is likely to be absorbed by the negative electrode plates 32 in the present invention A and the present invention B relatively to the comparative example. When the present invention A and the present invention B are compared with each other, more oxygen gas is absorbed as the aperture ratio is larger. The gas absorbency is improved as the aperture ratio of the through holes or the concave parts in the spacers are larger. The aperture ratio is, however, preferred to be at most 20% in order to prevent separation of the active materials.

Figure 16:
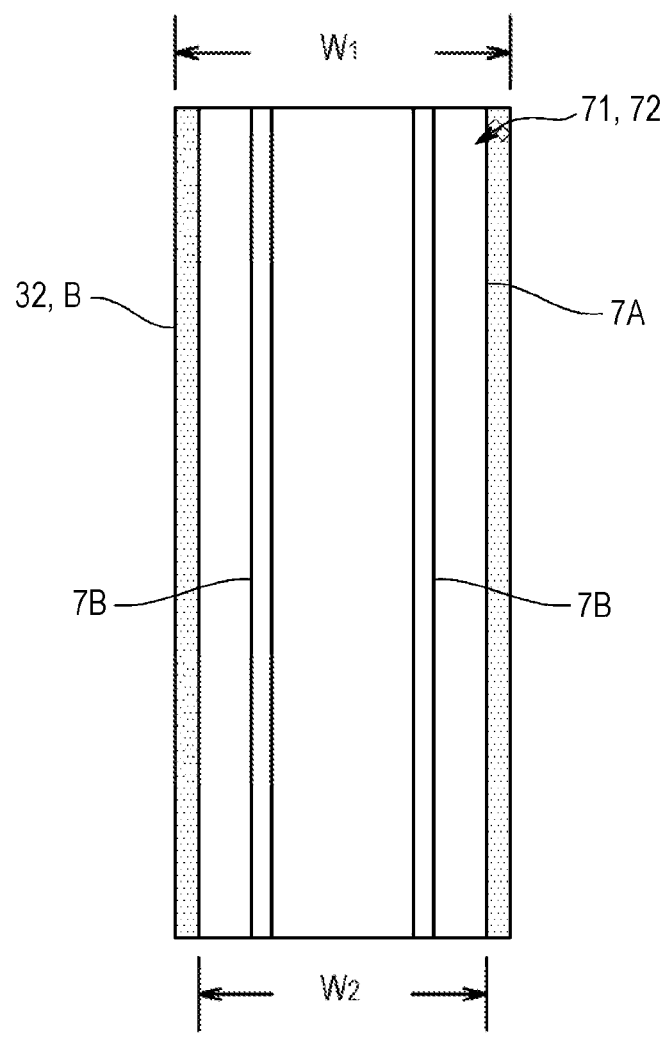
FIG. 16 shows a schematic view of a spacer according to another modification example of the second embodiment.

As shown in FIG. 16, the entire width of the first surface 7a can be made smaller than the width of each of the outer side surfaces 32a and 32b of the negative electrode plates 32.

In each of the spacers 71 and 72 shown in FIG. 16, the electrode contact portion 7A has substantially entire width (W2) that is smaller than width (W1) of each of the outer side surfaces 32a and 32b of the negative electrode plates 32. The contact areas of the spacers 71 and 72 with the outer side surfaces 32a and 32b of the negative electrode plates 32 are thus made smaller than the areas of the outer side surfaces 32a and 32b of the negative electrode plates 32. In this configuration, the ends in the width direction of the outer side surfaces 32a and 32b of the negative electrode plates 32 can be exposed from the spacers 71 and 72 so as to easily absorb oxygen gas. Furthermore, the spacers 71 and 72 reliably press the electrode group 3 toward the center in the width direction.

Figure 17:
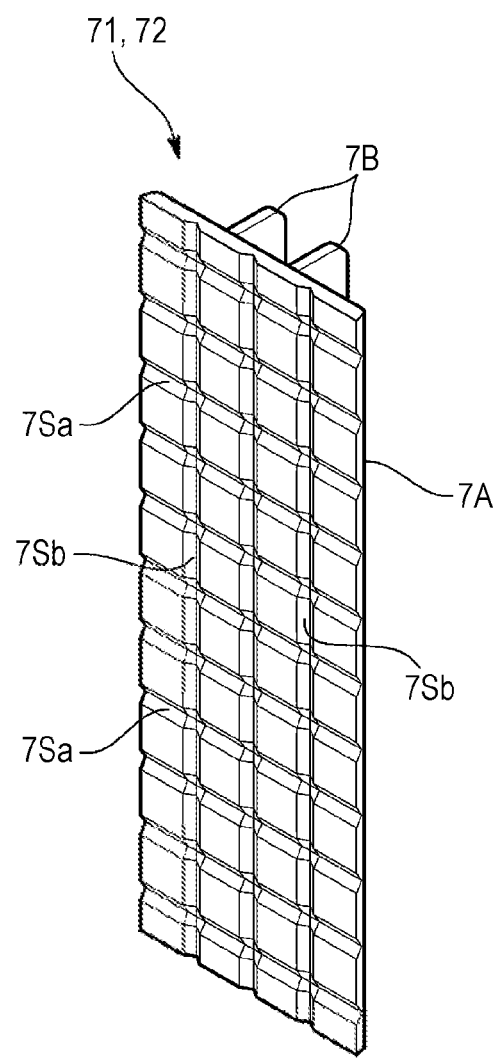
FIG. 17 shows a perspective view of a spacer according to still another modification example of the second embodiment.

Moreover, as shown in FIG. 17, the first surface 7a of the electrode contact portion 7A can have an uneven shape provided with convex and concave parts, and the concave parts can be opened to at least one of end surfaces in the width direction or in the height direction perpendicular to the width direction.

In each of the spacers 71 and 72 shown in FIG. 17, the first surface 7a of the electrode contact portion 7A has the convex and concave parts that are formed with a plurality of lateral grooves 7Sa opened to the both end surfaces in the width direction and a plurality of longitudinal grooves 7Sb opened to the both end surfaces in the longitudinal direction perpendicular to the width direction. The convex parts in the uneven shape thus formed have top surfaces that serve as the contact surfaces with each of the outer side surfaces 32a and 32b of the negative electrode plates 32. In this case, the contact areas of the spacers 71 and 72 with the outer side surfaces 32a and 32b of the negative electrode plates 32 are smaller than the areas of the outer side surfaces 32a and 32b of the negative electrode plates 32. The uneven shape is formed by the lateral grooves 7Sa and the longitudinal grooves 7Sb. This configuration allows oxygen gas generated from the positive electrode plate 31 to reach the centers of the outer side surfaces 32a and 32b of the negative electrode plates 32 and to be absorbed. The first surface 7a simply having the uneven shape prevents deterioration in mechanical strength of the electrode contact portion 7A.

Alternatively, the uneven shape can be formed only by one or a plurality of lateral grooves 7Sa, or can be formed only by one or a plurality of longitudinal grooves 7Sb. Still alternatively, the lateral grooves 7Sa can be opened only to one of the end surfaces in the width direction, whereas the longitudinal grooves 7Sb can be opened only to one of the end surfaces in the height direction. The uneven shape can be formed by embossing the first surface 7a.

The electrode contact portion 7A of each of the spacers 71 and 72 can have a shape obtained by combining the shapes described, above. For example, the electrode contact portion 7A of each of the spacers 71 and 72 can have both of the through holes 7H and the concave parts 7K, or can have the through holes 7H and the uneven shape.

Figure 18:
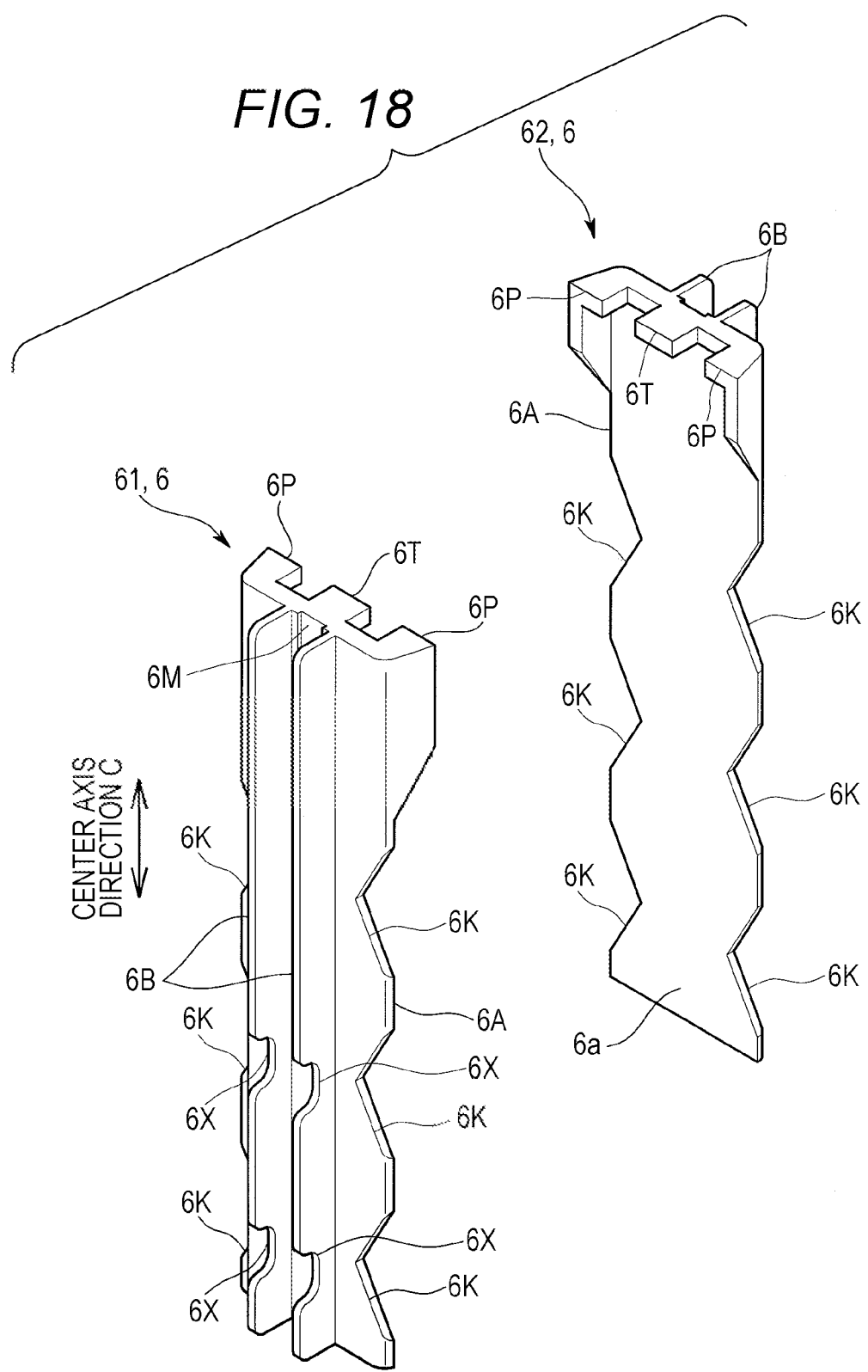
FIG. 18 is shows a perspective view of spacers according to a still another modification example of the second embodiment.

As shown in FIG. 18, each of the spacers 71 and 72 can have the case contact portions 7B each provided with communicating portions 7X that communicate the spaces partitioned by the case contact portion 7B, and the electrode contact portion 7A configured such that the contact area with each of the outer side surfaces 32a and 32b of the negative electrode plates 32 is smaller than the areas of the outer side surfaces 32a and 32b of the negative electrode plates 32. This configuration not only improves circulation of the electrolyte solution being filled but also stimulates absorption of oxygen gas by the negative electrodes. More specifically, when the electrolyte solution is filled in one of the spaces partitioned by the case contact portion 7B having the communicating portions 7X, the filled electrolyte solution flows into the other space through the communicating portions (concave parts) 7X, so that circulation of the electrolyte solution is improved. Even if a predetermined amount of the electrolyte solution to be filled in the battery case 2 is filled at one time, the electrolyte solution can be prevented from overflowing from the batter case 2. Furthermore, there is no need to fill the electrolyte solution gradually for several times, thereby enhancing workability of electrolyte solution filling. In addition, the contact area of the electrode contact portion 7A is made smaller than the areas of the outer side surfaces 32a and 32b of the negative electrode plates 32. In this configuration, the negative electrode plates 32 are likely to absorb oxygen gas generated from the positive electrode plate 31 during charging. Increase in internal pressure of the battery is thus prevented, and the cylindrical battery 200 can be improved in cycle life performance.

In each of the embodiments described above, the electrode group, in which the two opposite side surfaces are sandwiched between the paired spacers, is fixed in the battery case. Alternatively, the two opposite side surfaces of the electrode group can be sandwiched with three or more spacers. Still alternatively, there can be provided spacers between the four side surfaces of the electrode group and the inner peripheral surface of the battery case, respectively. The respective spacers can be coupled integrally by coupling portions.

The electrode group according to each of the embodiments described above is located in the battery case such that the layered direction is perpendicular to the center axis direction of the battery case. Alternatively, the electrode group can be located such that the layered direction is parallel to the center axis direction of the battery case.

The configuration of the electrode group is not limited to that according to each of the embodiments described above. The negative electrode plates and/or the positive electrode plate can be provided as a flat electrode plate.

The current collecting terminals of the negative electrode plates according to each of the embodiments described above are welded to the bottom surface of the battery case. Alternatively, the current collecting terminals can be welded to the inner peripheral surface of the battery case.

The configuration of the positive electrode plate and the configuration of the negative electrode plates in each of the embodiments described above can be switched with each other. More specifically, the current collecting terminal of the positive electrode plate can be welded to an inner surface of the battery case.

The present invention is applicable not only to an alkaline storage battery but also to a secondary battery such as a lithium ion secondary battery and a primary battery. The present invention is not limited to the embodiments described above, but can be obviously modified in various manners within the scope of the object thereof.

What is claimed is:

1. A cylindrical battery comprising:
a battery case having a cylindrical shape;
an electrode group disposed in the battery case, the electrode group comprising a positive electrode, a negative electrode, and a separator, the electrode group having a pair of flat outer side surfaces opposed to each other; and
a spacer disposed between an inner peripheral surface of the battery case and each of the flat outer side surfaces of the electrode group, wherein
the spacer has at least one case contact portion that extends continuously from a first axial end to a second axial end and is in contact with the inner peripheral surface of the battery case, and
the case contact portion is formed with at least one communicating portion that communicates spaces partitioned by the case contact portion.

2. The cylindrical battery according to claim 1, wherein the at least one communicating portion includes a plurality of communicating portions formed to the case contact portion with in interval in an axial direction.

3. The cylindrical battery according to claim 1, wherein the communicating portion is a concave per formed on a free end side of the case contact portion, and the free end side is in contact with the inner peripheral surface of the battery case.

4. The cylindrical battery according to claim 1, wherein the communicating portion is a through hole formed in the case contact portion.

5. The cylindrical battery according to claim 1, wherein the spacer has a flat electrode contact portion having a first surface serving as a contact surface with one of the outer side surfaces of the electrode group, and
the case contact portion is provided on a second surface of the electrode contact portion and extends continuously from a first axial end to a second axial end of the electrode contact portion.

6. The cylindrical battery according to claim 5, wherein
the at least one case contact portion includes at least two case contact portions that are disposed on the second surface of the electrode contact portion and are parallel to each other along a center axis direction.

7. A cylindrical battery comprising:
a battery case having a cylindrical shape;
an electrode group disposed in the battery case, the electrode group comprising a positive electrode, a negative electrode, and a separator, the electrode group having a pair of flat outer side surfaces opposed to each other, the negative electrode being exposed to the outer side surface; and
a spacer disposed between an inner peripheral surface of the battery case and each of the outer side surfaces of the electrode group, the spacer having an electrode contact portion being substantially in entire contact with the outer side surface, wherein
the electrode contact portion of the spacer has an area smaller than an area of the negative electrode exposed to the outer side surface.

8. The cylindrical battery according to claim 7, wherein
the electrode contact portion has a width with respective to the center axis direction, and entire or part of the electrode contact portion has a width smaller than a width of the outer side surface of the negative electrode.

9. The cylindrical battery according to claim 8, wherein
at least one of paired lateral sides, opposing in a width direction with respect to the center axis direction, of the electrode contact portion is provided with one or a plurality of concave parts that are concave inward in the width direction.

10. The cylindrical battery according to claim 7, wherein
the electrode contact portion is formed with one or a plurality of through holes.

11. The cylindrical battery according to claim 7, wherein
the electrode contact portion has an uneven surface facing the outer side surface of the negative electrode, the uneven surface has convex and concave parts, and the concave part is opened to at least one of end surfaces in the width direction or in the center axis direction.

12. A cylindrical battery comprising:
a battery case having a cylindrical shape;
an electrode group disposed in the battery case, the electrode group comprising a positive electrode, a negative electrode, and a separator, the electrode group having a pair of flat outer side surfaces opposed to each other, the negative electrode being exposed to the outer side surface; and
a spacer disposed between an inner peripheral surface of the battery case and each of the flat outer side surfaces of the electrode group, wherein
the spacer has a case contact portion and an electrode contact portion,
the case contact portion extends continuously from a first axial end to a second axial end, is in contact with the inner peripheral surface of the battery case, and is formed with a communicating portion that communicates spaces partitioned by the case contact portion, and
the electrode contact portion is substantially in entire contact with the outer side surface and has an area smaller than an area of the negative electrode exposed to the outer side surface.

* * * * *